United States Patent
Dougherty, Sr. et al.

(10) Patent No.: US 7,560,657 B2
(45) Date of Patent: Jul. 14, 2009

(54) PLASMA-ASSISTED PROCESSING IN A MANUFACTURING LINE

(75) Inventors: Michael L. Dougherty, Sr., Rochester Hills, MI (US); Devendra Kumar, Rochester Hills, MI (US); Satyendra Kumar, Troy, MI (US)

(73) Assignee: BTU International Inc., N. Billerica, MA (US)

( * ) Notice: Subject to any disclaimer, the term of this patent is extended or adjusted under 35 U.S.C. 154(b) by 569 days.

(21) Appl. No.: 10/513,605

(22) PCT Filed: May 7, 2003

(86) PCT No.: PCT/US03/14055

§ 371 (c)(1),
(2), (4) Date: Aug. 5, 2005

(87) PCT Pub. No.: WO03/096381

PCT Pub. Date: Nov. 20, 2003

(65) Prior Publication Data

US 2006/0081567 A1   Apr. 20, 2006

Related U.S. Application Data

(60) Provisional application No. 60/378,693, filed on May 8, 2002, provisional application No. 60/430,677, filed on Dec. 4, 2002, provisional application No. 60/435,278, filed on Dec. 23, 2002.

(51) Int. Cl.
*B23K 10/00* (2006.01)
(52) U.S. Cl. .................. 219/121.41; 219/121.43; 219/121.44; 156/345.41; 148/218

(58) Field of Classification Search .......... 219/121.36, 219/121.59, 121.37, 121.38, 121.52, 121.58, 219/121.43, 121.4, 121.41, 700, 701; 204/298.38; 148/218; 156/345.3, 345.41; 216/69, 70
See application file for complete search history.

(56) References Cited

U.S. PATENT DOCUMENTS 3,432,296 A   3/1969   McKinnon et al.

(Continued)

FOREIGN PATENT DOCUMENTS

DE       222 348 A1   5/1985

(Continued)

OTHER PUBLICATIONS

Accentus—http://www.accentus.co.uk/ipco/html/techenv6_txt_fr.html.

(Continued)

*Primary Examiner*—Mark H Paschall
(74) *Attorney, Agent, or Firm*—Weingarten, Schurgin, Gagnebin & Lebovici LLP

(57) ABSTRACT

Methods and apparatus are provided for plasma-assisted processing multiple work pieces in a manufacturing line. In one embodiment, the method can include placing the work pieces in movable carriers, moving the carriers on a conveyor into an irradiation zone, flowing a gas into the irradiation zone, igniting the gas in the irradiation zone to form a plasma (e.g., by subjecting the gas to electromagnetic radiation in the presence of a plasma catalyst), sustaining the plasma for a period of time sufficient to at least partially plasma process at least one of the work pieces in the irradiation zone, and advancing the conveyor to move the at least one plasma-processed work piece out of the irradiation zone. Various types of plasma catalysts are also provided.

40 Claims, 11 Drawing Sheets

U.S. PATENT DOCUMENTS

| | | |
|---|---|---|
| 3,612,686 A | 10/1971 | Braman |
| 3,731,047 A | 5/1973 | Mullen et al. |
| 4,004,934 A | 1/1977 | Prochazka |
| 4,025,818 A | 5/1977 | Giguere |
| 4,090,055 A | 5/1978 | King |
| 4,147,911 A | 4/1979 | Nishitani |
| 4,151,034 A | 4/1979 | Yamamoto et al. |
| 4,213,818 A | 7/1980 | Lemons et al. |
| 4,230,448 A | 10/1980 | Ward et al. |
| 4,265,730 A | 5/1981 | Hirose et al. |
| 4,307,277 A | 12/1981 | Maeda |
| 4,339,326 A | 7/1982 | Hirose et al. |
| 4,404,456 A | 9/1983 | Cann |
| 4,473,736 A | 9/1984 | Bloyet et al. |
| 4,479,075 A | 10/1984 | Elliott |
| 4,500,564 A | 2/1985 | Enomoto |
| 4,504,007 A | 3/1985 | Anderson, Jr. |
| 4,589,424 A * | 5/1986 | Vaguine ..................... 607/154 |
| 4,609,808 A | 9/1986 | Bloyet et al. |
| 4,611,108 A | 9/1986 | Leprince et al. |
| 4,624,738 A | 11/1986 | Westfall et al. |
| 4,664,937 A | 5/1987 | Ovshinsky et al. |
| 4,666,775 A | 5/1987 | Kim et al. |
| 4,687,560 A | 8/1987 | Tracy |
| 4,698,234 A | 10/1987 | Ovshinsky |
| 4,760,230 A | 7/1988 | Hassler |
| 4,767,902 A | 8/1988 | Palaith |
| 4,772,770 A | 9/1988 | Matsui |
| 4,792,348 A | 12/1988 | Pekarsky |
| 4,840,139 A | 6/1989 | Takei |
| 4,871,581 A | 10/1989 | Yamazaki |
| 4,877,589 A | 10/1989 | O'Hare |
| 4,877,938 A | 10/1989 | Rau et al. |
| 4,883,570 A | 11/1989 | Efthimion et al. |
| 4,888,088 A | 12/1989 | Slomowitz |
| 4,891,488 A | 1/1990 | Davis |
| 4,897,285 A | 1/1990 | Wilhelm |
| 4,908,492 A | 3/1990 | Okamoto et al. |
| 4,919,077 A | 4/1990 | Oda |
| 4,924,061 A | 5/1990 | Labat |
| 4,946,547 A | 8/1990 | Palmour |
| 4,956,590 A | 9/1990 | Phillips |
| 4,963,709 A | 10/1990 | Kimrey |
| 4,972,799 A | 11/1990 | Misumi |
| 5,003,152 A | 3/1991 | Giusti |
| 5,010,220 A | 4/1991 | Apte |
| 5,017,404 A | 5/1991 | Paquet |
| 5,023,056 A * | 6/1991 | Aklufi et al. ................. 422/186 |
| 5,058,527 A | 10/1991 | Ohta et al. |
| 5,072,650 A | 12/1991 | Phillips |
| 5,074,112 A | 12/1991 | Walton |
| 5,085,885 A | 2/1992 | Foley et al. |
| 5,087,272 A | 2/1992 | Nixdorf |
| 5,103,715 A | 4/1992 | Phillips |
| 5,120,567 A | 6/1992 | Frind et al. |
| 5,122,633 A | 6/1992 | Moshammer |
| 5,131,993 A | 7/1992 | Suib et al. |
| 5,164,130 A | 11/1992 | Holcombe |
| 5,202,541 A | 4/1993 | Patterson |
| 5,222,448 A | 6/1993 | Morgenthaler et al. |
| 5,223,308 A | 6/1993 | Doehler |
| 5,224,117 A | 6/1993 | Kruger et al. |
| 5,227,695 A | 7/1993 | Pelletier |
| 5,271,963 A | 12/1993 | Elchman et al. |
| 5,276,297 A | 1/1994 | Nara |
| 5,276,386 A | 1/1994 | Watanabe |
| 5,277,773 A | 1/1994 | Murphy |
| 5,284,544 A | 2/1994 | Mizutani et al. |
| 5,304,766 A | 4/1994 | Baudet et al. |
| 5,307,892 A | 5/1994 | Phillips |
| 5,310,426 A | 5/1994 | Mori |
| 5,311,906 A | 5/1994 | Phillips |
| 5,316,043 A | 5/1994 | Phillips |
| 5,321,223 A | 6/1994 | Kimrey |
| 5,349,154 A | 9/1994 | Harker et al. |
| 5,366,764 A | 11/1994 | Sunthankar |
| 5,370,525 A | 12/1994 | Godon |
| 5,423,180 A | 6/1995 | Nobue et al. |
| 5,435,698 A | 7/1995 | Phillips |
| 5,449,887 A | 9/1995 | Holcombe |
| 5,505,275 A | 4/1996 | Phillips |
| 5,514,217 A | 5/1996 | Niino |
| 5,520,740 A | 5/1996 | Kanai |
| 5,521,360 A | 5/1996 | Johnson et al. |
| 5,523,126 A | 6/1996 | Sano |
| 5,527,391 A | 6/1996 | Echizen et al. |
| 5,536,477 A | 7/1996 | Cha et al. |
| 5,597,456 A | 1/1997 | Maruyama et al. |
| 5,607,509 A | 3/1997 | Schumacher |
| 5,616,373 A | 4/1997 | Karner |
| 5,645,897 A | 7/1997 | Andra |
| 5,651,825 A | 7/1997 | Nakahigashi et al. |
| 5,662,965 A | 9/1997 | Deguchi |
| 5,670,065 A | 9/1997 | Bickmann et al. |
| 5,671,045 A | 9/1997 | Woskov |
| 5,682,745 A | 11/1997 | Phillips |
| 5,689,949 A | 11/1997 | DeFreitas |
| 5,712,000 A | 1/1998 | Wei et al. |
| 5,714,010 A | 2/1998 | Matsuyama et al. |
| 5,715,677 A | 2/1998 | Wallman et al. |
| 5,734,501 A | 3/1998 | Smith |
| 5,735,451 A | 4/1998 | Mori |
| 5,741,364 A | 4/1998 | Kodama |
| 5,755,097 A | 5/1998 | Phillips |
| 5,794,113 A | 8/1998 | Munir et al. |
| 5,796,080 A | 8/1998 | Jennings |
| 5,808,282 A | 9/1998 | Apte |
| 5,828,338 A | 10/1998 | Gerstenberg |
| 5,841,237 A | 11/1998 | Alton |
| 5,847,355 A | 12/1998 | Barmatz et al. |
| 5,848,348 A | 12/1998 | Dennis |
| 5,859,404 A | 1/1999 | Wei |
| 5,868,871 A | 2/1999 | Yokose et al. |
| 5,874,705 A | 2/1999 | Duan |
| 5,904,993 A | 5/1999 | Takeuchi |
| 5,939,026 A | 8/1999 | Seki et al. |
| 5,945,351 A | 8/1999 | Mathuni |
| 5,961,773 A | 10/1999 | Ichimura et al. |
| 5,961,871 A | 10/1999 | Bible et al. |
| 5,973,289 A | 10/1999 | Read et al. |
| 5,976,429 A | 11/1999 | Chen |
| 5,980,843 A | 11/1999 | Silversand |
| 5,980,999 A | 11/1999 | Goto et al. |
| 5,989,477 A | 11/1999 | Berger |
| 5,993,612 A | 11/1999 | Rostaing et al. |
| 5,998,774 A | 12/1999 | Joines et al. |
| 6,011,248 A | 1/2000 | Dennis |
| 6,028,393 A | 2/2000 | Izu |
| 6,038,854 A | 3/2000 | Penetrante et al. |
| 6,054,693 A | 4/2000 | Barmatz et al. |
| 6,054,700 A | 4/2000 | Rokhvarger |
| 6,096,389 A | 8/2000 | Kanai |
| 6,101,969 A | 8/2000 | Niori |
| 6,103,068 A | 8/2000 | Merten et al. |
| 6,122,912 A | 9/2000 | Phillips |
| 6,131,386 A | 10/2000 | Trumble |
| 6,132,550 A | 10/2000 | Shiomi |
| 6,149,985 A | 11/2000 | Grace et al. |
| 6,152,254 A | 11/2000 | Phillips |
| 6,153,868 A | 11/2000 | Marzat |
| 6,183,689 B1 | 2/2001 | Roy et al. |
| 6,186,090 B1 | 2/2001 | Dotter |
| 6,189,482 B1 | 2/2001 | Zhao |
| 6,204,606 B1 | 3/2001 | Spence |

| | | | | | | |
|---|---|---|---|---|---|---|
| 6,224,836 B1 | 5/2001 | Moisan et al. | | EP | 0 670 666 B1 | 6/1998 |
| 6,228,773 B1 | 5/2001 | Cox | | EP | 0 724 720 B1 | 5/2000 |
| 6,238,629 B1 | 5/2001 | Barankova et al. | | EP | 1 093 846 A1 | 4/2001 |
| 6,248,206 B1 | 6/2001 | Herchen et al. | | EP | 1 427 265 A2 | 6/2004 |
| 6,264,812 B1 | 7/2001 | Raaijmakers et al. | | JP | 56-140021 A2 | 11/1981 |
| 6,284,202 B1 | 9/2001 | Cha et al. | | JP | 57-119164 A2 | 7/1982 |
| 6,287,980 B1 | 9/2001 | Hanazaki et al. | | JP | 58-025073 A | 2/1983 |
| 6,287,988 B1 | 9/2001 | Nagamine et al. | | JP | 59-169053 A | 9/1984 |
| 6,297,172 B1 | 10/2001 | Kashiwagi | | JP | 62-000535 A | 1/1987 |
| 6,297,595 B1 | 10/2001 | Stimson | | JP | 04-74858 A | 3/1992 |
| 6,329,628 B1 | 12/2001 | Kuo | | JP | 06-345541 A | 12/1994 |
| 6,342,195 B1 | 1/2002 | Roy et al. | | JP | 07-153405 A | 6/1995 |
| 6,345,497 B1 | 2/2002 | Penetrante et al. | | JP | 09-235686 A | 2/1996 |
| 6,348,158 B1 | 2/2002 | Samukawa | | JP | 08-217558 A | 8/1996 |
| 6,358,361 B1 | 3/2002 | Matsumoto | | JP | 08-281423 A | 10/1996 |
| 6,362,449 B1 | 3/2002 | Hadidi | | JP | 09-017597 A | 1/1997 |
| 6,365,885 B1 | 4/2002 | Roy et al. | | JP | 09-023458 A | 1/1997 |
| 6,367,412 B1 | 4/2002 | Ramaswamy et al. | | JP | 09-027459 A | 1/1997 |
| 6,370,459 B1 | 4/2002 | Phillips | | JP | 09-027482 A | 1/1997 |
| 6,372,304 B1 | 4/2002 | Sano et al. | | JP | 09-078240 A | 3/1997 |
| 6,376,027 B1 | 4/2002 | Lee et al. | | JP | 09-102400 A | 4/1997 |
| 6,383,333 B1 | 5/2002 | Haino et al. | | JP | 09-102488 A | 4/1997 |
| 6,383,576 B1 | 5/2002 | Matsuyama | | JP | 09-111461 A | 4/1997 |
| 6,388,225 B1 | 5/2002 | Blum et al. | | JP | 09-137274 A | 5/1997 |
| 6,392,350 B1 | 5/2002 | Amano | | JP | 09-157048 A | 6/1997 |
| 6,407,359 B1 | 6/2002 | Lagarde et al. | | JP | 09-223596 A | 8/1997 |
| 6,488,112 B1 | 12/2002 | Kleist | | JP | 09-235686 A | 9/1997 |
| 6,512,216 B2 | 1/2003 | Gedevanishvili et al. | | JP | 09-251971 A | 9/1997 |
| 6,522,055 B2 | 2/2003 | Uemura et al. | | JP | 09-295900 A | 11/1997 |
| 6,575,264 B2 | 6/2003 | Spadafora | | JP | 10-066948 A | 3/1998 |
| 6,592,664 B1 | 7/2003 | Frey et al. | | JP | 10-081588 A | 3/1998 |
| 6,610,611 B2 | 8/2003 | Liu et al. | | JP | 10-081970 A | 3/1998 |
| 6,712,298 B2 | 3/2004 | Kohlberg et al. | | JP | 10-087310 A | 4/1998 |
| 6,717,368 B1 | 4/2004 | Skamoto et al. | | JP | 10-204641 A | 8/1998 |
| 6,870,124 B2 | 3/2005 | Kumar et al. | | JP | 10-259420 A | 9/1998 |
| 2001/0027023 A1 | 10/2001 | Ishihara et al. | | JP | 10-294306 A | 11/1998 |
| 2001/0028919 A1 | 10/2001 | Liu et al. | | JP | 11-031599 A | 2/1999 |
| 2002/0034461 A1 | 3/2002 | Segal | | JP | 11-106947 A | 4/1999 |
| 2002/0036187 A1 | 3/2002 | Ishll et al. | | JP | 11-145116 A | 5/1999 |
| 2002/0124867 A1 | 9/2002 | Kim et al. | | JP | 11-186222 A | 7/1999 |
| 2002/0135308 A1 | 9/2002 | Janos et al. | | JP | 11-228290 A | 8/1999 |
| 2002/0140381 A1 | 10/2002 | Golkowski et al. | | JP | 11-265885 A | 9/1999 |
| 2002/0190061 A1 | 12/2002 | Gerdes et al. | | JP | 11-273895 A | 10/1999 |
| 2002/0197882 A1 | 12/2002 | Niimi et al. | | JP | 11-297266 A | 10/1999 |
| 2003/0071037 A1 | 4/2003 | Sato et al. | | JP | 2000-012526 A | 1/2000 |
| 2003/0111334 A1 | 6/2003 | Dodelet et al. | | JP | 2000-173989 A | 6/2000 |
| 2003/0111462 A1 | 6/2003 | Sato et al. | | JP | 2000-203990 A | 7/2000 |
| 2004/0001295 A1 | 1/2004 | Kumar et al. | | JP | 2000-269182 A | 9/2000 |
| 2004/0004062 A1 | 1/2004 | Kumar et al. | | JP | 2000-288382 A | 10/2000 |
| 2004/0045636 A1* | 3/2004 | Poirier et al. ............... 148/218 | | JP | 2000-306901 A | 11/2000 |
| 2004/0070347 A1 | 4/2004 | Nishida et al. | | JP | 2000-310874 A | 11/2000 |
| 2004/0089631 A1 | 5/2004 | Blalock et al. | | JP | 2000-310876 A | 11/2000 |
| 2004/0107796 A1 | 6/2004 | Kumar et al. | | JP | 2000-317303 A | 11/2000 |
| 2004/0107896 A1 | 6/2004 | Kumar et al. | | JP | 2000-323463 A | 11/2000 |
| 2004/0118816 A1 | 6/2004 | Kumar et al. | | JP | 2000-348897 A | 12/2000 |
| 2005/0039853 A1* | 2/2005 | Rigali et al. ............ 156/345.31 | | JP | 2001-013719 A | 1/2001 |
| | | | | JP | 2001-053069 A | 2/2001 |
| FOREIGN PATENT DOCUMENTS | | | | JP | 2001-058127 A | 3/2001 |
| | | | | JP | 2001-093871 A | 4/2001 |
| DE | 195 42 352 A1 | 5/1997 | | JP | 2001-149754 A | 6/2001 |
| DE | 100 05 146 A1 | 8/2001 | | JP | 2001-149918 A | 6/2001 |
| EP | 0 228 864 B1 | 7/1987 | | JP | 2001-196420 A | 7/2001 |
| EP | 0 335 675 A2 | 10/1989 | | JP | 2001-303252 A | 10/2001 |
| EP | 0 435 591 A2 | 12/1990 | | JP | 2001-332532 A | 11/2001 |
| EP | 0 436 361 A1 | 12/1990 | | JP | 2001-351915 A | 12/2001 |
| EP | 0 228 864 B1 | 3/1991 | | JP | 2002-022135 A | 1/2002 |
| EP | 0 420 101 A2 | 4/1991 | | JP | 2002-028487 A | 1/2002 |
| EP | 0 435 591 A | 7/1991 | | JP | 2002-069643 A | 3/2002 |
| EP | 0 436 361 A1 | 7/1991 | | JP | 2002-075960 A | 3/2002 |
| EP | 0 520 719 B1 | 12/1992 | | JP | 2002-126502 A | 5/2002 |
| EP | 0 670 666 A1 | 9/1995 | | JP | 2002-273161 A | 9/2002 |
| EP | 0 520 719 B1 | 5/1996 | | JP | 2002-273168 A | 9/2002 |
| EP | 0 724 720 B1 | 8/1996 | | JP | 2003-075070 A | 3/2003 |

| | | |
|---|---|---|
| JP | 2003-264057 A | 9/2003 |
| WO | WO 95-11442 A1 | 4/1995 |
| WO | WO 96/06700 A1 | 3/1996 |
| WO | WO 96/38311 A1 | 12/1996 |
| WO | WO 97-13141 A1 | 4/1997 |
| WO | WO 01-55487 A2 | 8/2001 |
| WO | WO 01-58223 A1 | 8/2001 |
| WO | WO 01-82332 A1 | 11/2001 |
| WO | WO 02-026005 A1 | 3/2002 |
| WO | WO 02-26005 A1 | 3/2002 |
| WO | WO 02-061165 A1 | 8/2002 |
| WO | WO 02-061171 A1 | 8/2002 |
| WO | WO 02-062114 A1 | 8/2002 |
| WO | WO 02-062115 A1 | 8/2002 |
| WO | WO 02-067285 A2 | 8/2002 |
| WO | WO 02-067285 A3 | 8/2002 |
| WO | WO 03-018862 A2 | 3/2003 |
| WO | WO 03-018862 A3 | 3/2003 |
| WO | WO 03-028081 A2 | 4/2003 |
| WO | WO 03-095058 A2 | 11/2003 |
| WO | WO 03/095089 | 11/2003 |
| WO | WO 03-095089 A1 | 11/2003 |
| WO | WO 03/095090 A1 | 11/2003 |
| WO | WO 03-095090 A1 | 11/2003 |
| WO | WO 03/095130 A1 | 11/2003 |
| WO | WO 03-095130 A1 | 11/2003 |
| WO | WO 03-095591 A1 | 11/2003 |
| WO | WO 03/095591 A1 | 11/2003 |
| WO | WO 03-095699 A1 | 11/2003 |
| WO | WO 03/095699 A1 | 11/2003 |
| WO | WO 03/095807 | 11/2003 |
| WO | WO 03-095807 A1 | 11/2003 |
| WO | WO 03-096369 A1 | 11/2003 |
| WO | WO 03/096369 A1 | 11/2003 |
| WO | WO 03-096370 A1 | 11/2003 |
| WO | WO 03-096380 A2 | 11/2003 |
| WO | WO 03/096380 A2 | 11/2003 |
| WO | WO 03-096381 A2 | 11/2003 |
| WO | WO 03/096381 A2 | 11/2003 |
| WO | WO 03-096382 A2 | 11/2003 |
| WO | WO 03-096383 A2 | 11/2003 |
| WO | WO 03-096747 A2 | 11/2003 |
| WO | WO 03/096749 A1 | 11/2003 |
| WO | WO 03-096749 A1 | 11/2003 |
| WO | WO 03-096766 A1 | 11/2003 |
| WO | WO 03/096768 A1 | 11/2003 |
| WO | WO 03/096770 A1 | 11/2003 |
| WO | WO 03-096770 A1 | 11/2003 |
| WO | WO 03-096771 A1 | 11/2003 |
| WO | WO 03-096772 A1 | 11/2003 |
| WO | WO 03-096773 A1 | 11/2003 |
| WO | WO 03/096773 A1 | 11/2003 |
| WO | WO 03-096774 A1 | 11/2003 |
| WO | WO 2004-050939 A2 | 6/2004 |

OTHER PUBLICATIONS

Agrawal et al., "Grain Growth Control in Microwave Sintering of Ultrafine WC-Co Composite Powder Compacts," Euro PM99, Sintering, Italy, 8 pages (1999).
Agrawal et al., "Microwave Sintering of Commercial WC/Co Based Hard Metal Tools," Euro PM99, Sintering, Italy, 8 pages (1999).
Agrawal, D., "Metal Parts from Microwave," 2 pages.
Agrawal, D., "Microwave Processing of Ceramics," *Current Opinion in Solid State and Material Science*, 3:480-485 (1998).
Air Liquide, Heat Treatment—Gas Quenching,—http://www.airliquide.com/en/business/industry/ metals/applications/heat_treatment/quenching, 1 page (2000).
Alexander et al., "Electrically Conducive Polymer Nanocomposite Materials," AFRL's Materials and Manufacturing Directorate, Nonmetallic Materials Division, Polymer Branch, Wright-Patterson AFB OH—http://www.afrlhorizons.com/Briefs/Sept02/ML0206.html , 2 pages (Sep. 2002).
Al-Shamma'A et al., "Microwave Atmospheric Plasma for Cleaning Exhaust Gases and Particulates," University of Liverpool, Dept. of Electrical Engineering and Electronics.
Alton et al., "A High-Density, RF Plasma-Sputter Negative Ion Source," 3 pages.
Anklekar et al., Microwave Sintering And Mechanical Properties of PM Copper Steel, pp. 355-362 (2001).
Batanov et al., "Plasmachemical Deposition of Thin Films in a Localized Free-Space Microwave Discharge," *Technical Physics*, 38:6, pp. 475-479 (1993).
Carbonitriding, Treat All Metals, Inc., 2 pages—http://www.treatallmetals.com/carbon.htm.
Carburizing,—Heat Treating by Treat All Metals—http://www.treatallmetals.com/gas.htm, 2 pages.
Cheng et al., "Microwave Processing of WC-Co Composites And Ferroic Titanates" (Original Article), *Mat Res Innovat* (1):44-52 (1997).
Cheng, J., "Fabricating Transparent Ceramics by Microwave Sintering," *Focus on Electronics*, 79:9, pp. 71-74 (2000).
Circle Group Holdings, Inc. eMentor Companies "StarTech Environmental Corp."—http://www.crgq.com/cgiweb/HTML/eMentor_Companies/startech.html, 9 pages.
Classification of Cast Iron—Key to Steel—Article—http://www.key-to-steel.com/Articles/Art63.htm, 3 pages.
Collin, *Foundations for Microwave Engineering*, 2d Ed., IEEE Press, NY, pp. 180-192 (2001).
Controlled Atmosphere Sinter-Hardening, 2 pages.
Egashira,. "Decomposition of Trichloroethylene by Microwave-induced Plasma Generated from SiC whiskers," *J. Electrochem. Soc.*, 145:1, pp. 229-235 (Jan. 1998).
Ford 1.3L Catalytic Converter (1988-1989)—http://catalyticconverters.com/FO13L43778889.html, 1 page.
Ford Contour Catalytic Converter (1995-1996)—http://www.all-catalytic-converters.com/ford-contour-converter.html, 2 pages.
Fraunhofer ILT, "Plasma-Reactors for Aftertreatment of Automobile Exhaust Gas," Fraunhofer-Gesellschaft (2002)—http://www.ilt.fhg.de/eng/jb01-s35.html, 1 page.
French, "The Plasma Waste Converter—From Waste Disposal to Energy Creation,"—http://www.arofe.army.mil/Conferences/CWC2001/French.htm, p. 1.
Gao et al., "Superfast Densification of Oxide/Oxide Ceramic Composites," *J. Am. Ceram. Soc.* 82[4]1061-63 (1999)—http://216.239.39.100/search?q=cache:b-TFhQInU6YC:www.umr.edu/~hruiz/GaoShen.ppt+spark+plasma.
Gedevanishvili et al., "Microwave Combustion Synthesis And Sintering of Intermetallics And Alloys," *Journal of Materials Science Letters*, (18), pp. 665-668 (1999).
General Eastern, Semiconductor Manufacturing—Using the HygroTwin 2850 to Reduce Costs, Improve Quality, TIM 003, 3 pages, (1997).
George, S.J., "The Catalytic Converter," 5 pages, (2002)—http://krioma.net/Articles/Catalytic%20Converter/Catalytic%20Converter.html.
GlassTesseract.Org—The Home of Kenz Benz, "Tech Procedures and Tips: Exhaust Manifolds and Catalytic Converters Removal—and Installation," 4 pages (2003)—http://glasstesseract.org/tech/catalytic.html.
Grant, J., Hackh's Chemical Dictionary, 3rd ed. p. 174-175.
Holt Walton & Hill, Heat Treatment of Steels—The Processes, Azom.com, 9 pages, (2002).
Holt Walton & Hill, Powder Metallurgy—Overview of the Powder Metallurgy Process, Azom.com, 3 pages (2002)—http://www.azom.com/details.asp?ArticleID=1414.
Honda Automobile News Press Release, "Honda Introduces Its First Two Clean Air Vehicles, the Civic Ferio LEV and Partners 1.6 LEV", 3 pages (Feb. 1997)—http://world.honda.com/news/1997/4970217a.html.
Honda Civic CX Catalytic Converter, 1 page (1996-2000)—http://www.catalyticconverters.com/HOCIVICCX4349600.html.
How A Blast Furnace Works—The Blast Furnace Plant, AISI Learning Center: http://www.steel.org/learning/howmade/blast_furnace.htm.

How Is Steel Made, Answer Discussion, 6 pages—http://ourworld.compuserve.com/homepages/Dyaros/stlmanuf.htm.

Hsu et al., "Palladium-Coated Kieselguhr for Simultaneous Separation and Storage of Hydrogen," Westinghouse Savannah River Company, U.S. Dept. of Commerce, National Technical Information Service, 14 pages (2001).

Hydrogen Separation Membrane,—Advanced Gas Separation: H2 Separation, 1 page (2001).

IRC in Materials Processing, "Advanced Melting, Atomisation, Powder and Spray Forming, Plasma Melting—Operation of a Plasma Furnace," University of Birmingham, 3 pages—http://www.irc.bham.ac.uk/theme1/plasma/furnace.htm.

*Iron and Steel*, 6:(16-22).

Japanese Afvanced Environment Equipment, "Waste and Recycling Equipment—Mitsubishi Graphi Electrode Type Plasma Furnace," 3 pages—http://nett21.unep.or.jp/JSIM_DATA/WASTE/WASTE_3/html/Doc_467.html.

Johnson, D.L., "Fundamentals of Novel Materials Processing," Dept. of Materials Science & Engineering, Northwestern University, 2 pages—http://www.matsci.northerwestern.edu/faculty/dlj.html.

Kalyanaraman et al., "Synthesis and Consolidation of Iron Nanopowders," *NanoStructured Materilas*, vol. 10, No. 8, pp. 1379-1392 (1998).

Karger, Odo—Area of Work: Microwave Welding, 2 pages (Nov. 2002).

Kong et al., "Nuclear-Energy-Assisted Plasma Technology for Producing Hydrogen," Nuclear Energy Research Initiative, 4 pages (2002).

Lewis, R. J. Sr., "Hawley's Condensed Chemical Dictionary," 12th ed., p. 230-232 (1993).

Lucas, J., "Welding Using Microwave Power Supplies," Computer Electronics & Robotics—http://www.liv.ac.uk/EEE/research/cer/project6.htm.

Luggenholscher et al., "Investigations on Electric Field Distributions in a Microwave Discharge in Hydrogen," Institute fur Laser- und Plasmaphysik, Univsitat Essen, Germany, 4 pages.

Microelectronics Plasma Applications,—March Plasma Systems, 2 pages (2002)—http://www.marchplasma.com/micro_app.htm.

Micro-fabricated Palladium-Silver Membrane for Hydrogen Separation and Hydro/Dehydrogenation Reactions, Research Education Group, 5 pages—http://utep.el.utwente.nl/tt/projects/sepmem/.

Microwave Joining of Alumina and Zirconia Ceramics, IRIS, Research Topics 1998, 1 page.

Microwave Welding (EWi Welding Network) 1 page—http://www.ferris.edu/cot/accounts/plastics/htdocs/Prey/Microwave%20Homepage.htm.

Microwave Welding of Plastics, TWI World Centre for Materials Joining Technology, 2 pages, (Aug. 2002)—http://www.twi.co.uk/j32k/protected/band_3/ksab001.htm.

Microwave Welding, Welding and Joining Information Network, 3 pages (Nov. 2002)—http://www.ewi.org/technologies/plastics/microwave.asp.

Moss et al., "Experimental Investigation of Hydrogen Transport Through Metals," Los Alamos National Library, 5 pages—http://www.education.lanl.gov/RESOURCES/h2/dye/education.html.

Nitriding, TreatAll Metals, Inc., 2 pages—http://www.treatallmetals.com/nitrid.htm.

Non-Thermal Plasma Aftertreatment of Particulates—Theoretical Limits and Impact on Reactor Design, 27 pages—http://www.aeat.com/electrocat/sae/intro . . . references.htm.

Office of Energy Efficiency, "Using Non-Thermal Plasma Reactor to Reduce NOx Emissions from CIDI Engines," 1 page (Apr. 1999).

Optoelectronic Packaging Applications, March Plasma Systems, 2 pages (2002)—http://www.marchplasma.com/opto_app.htm.

Paglieri et al., "Palladium Alloy Composite Membranes for Hydrogen Separation," Abstract, Los Alamos National Library, 5 pages.

Peelamedu et al., "Anisothermal Reaction Synthesis of Garnets, Ferrites, And Spinels In Microwave Field," *Materials Research Bulletin* (36):2723-2739 (2001).

PerfectH2TM PE8000 Series, "Palladium Diffusion Hydrogen Purifier For High Flow Rate MOCVD Applications" Matheson Tri.Gas, 2 pages (2002).

Photonics Dictionary, "Definition for Word(s): Thyratron" (Laurin Publishing), 2 pages (1996-2003)—http://www.photonics.com/dictionary/lookup/lookup.asp?url=lookup&entrynum=538.

Pingel, V.J., "About What Every P/A Should Know About P/M," Powder Metallurgy Co., 9 pages—http://www.powdermetallurgyco.com/pm_about.htm.

Plasma Applications, Coalition for Plasma Science, 2 pages (1999, 2000)—http://www.plasmacoalition.org/applications.htm.

Plasma Carburizing, 1 page—http://www.ndkinc.co.jp/ndke04.html.

Plasma Direct Melting Furnace, Materials Magic, Hitachi Metals Ltd., 3 pages—http://www.hitachi-metals.co.jp/e/prod/prod07/p07_2_02.html.

Plasma Electronics, Classical Plasma Applications, 2 pages (2002)—http://www.plasma.iinpe.br/English/Classical_Applications.htm.

Plasms Nitride Process Description, Northeast Coating Technologies, 2 pages.

Plasma Science and Technology, "Plasmas for Home, Business and Transportation," p. 4—http://www.plasmas.org/rot-home.htm.

Plasma-Assisted Catalyst Systems, Novel Plasma Catalysts Significantly Reduce NOx from Diesel Engines, 2 pages (Apr. 2001)—http://www.ott.doe.gov/success.html (2 pages).

Printed Circuit Board (PCB) Plasma Applications, March Plasma Systems, 2 pages (2002)—http://www.marchplasma.com/pcb_app.01.htm.

Roy et al., "Full Sintering of Powdered-Metal Bodies In A Microwave Field," *Nature*, vol. 399, pp. 668-670 (Jun. 17, 1999).

Roy et al., "Microwave Processing: Triumph of Applications-Driven Science in WC-Composites And Ferroic Titanates," *Ceramic Transactions*, vol. 80, pp. 3-26, (1997).

Roy et al., "Definitive Experimental Evidence for Microwave Effects: Radically New Effects of Separated E nad H Fields, Such As Decrystallization of Oxides in Seconds," *Materials Research Innovations*, Springer-Verlag, vol. 6, No. 3, pp. 129-140 (2002).

Roy et al., "Major phase transformations and magnetic property changescaused by electromagnetic fields at microwave frequencies," *Journal Of Material Research*, 17:12, pp. 3008-3011 (2002).

Rusanov, V. D., Hydrogen Energy & Plasma Techologies Institute: Russian Research Centre Kurchatov Institute, 13 pages,—http://www.kiae.ru/eng/str/ihept/oiivept.htm.

Samant et al., "Glow Discharge Nitriding Al 6063 Samples and Study of Their Surface Hardness," Metallofizika I Noveishe Takhnologii, 23(3), pp. 325-333 (2001).

Sato et al., Surface Modification of Pure Iron by RF Plasma Nitriding with DC Bias Voltage Impression, *Hyomen Gijutsu* 48(3), pp. 317-323 (1997) (English Abstract).

Saveliev Y. "Effect of Cathode End Caps and a Cathode Emissive Surface on Relativistic Magnetron Operation," *IEEE Transactions on Plasma Science*, 28:3, pp. 478-484 (Jun. 2000).

SC/Tetra Engine Manifold Application, 2 pages (2001)—http://www.sctetra.com/applications/01_manifold.htm.

Shulman et al., "Microwaves In High-Temperature Processes," GrafTech, 8 pages (Mar. 2003) http://www.industrialheating.com/CDA/ArticleInformation/features/BNP_Features_Item/0,2832,94035,00.html.

Slone et al., "Nox Reduction For Lean Exhaust Using Plasma Assisted Catalysis," Noxtech Inc., 5 pages (2000)—http://www.osti.gov/fcvt/deer2000/bhattpa.pdf.

Stockwell Rubber Company, Inc., "Conductive Silicone Rubber Compounds Product Selection Guide," Electrically Conducive Materials, 3 pages—http://www.stockwell.com/electrically_conducive_produc.htm.

Sumitomo Heavy Industries, Ltd., "Spark Plasma Sintering—What is Spark Plasma Sintering," 3 pages (2001)—http://www.shi.co.jp/sps/eng/.

Surface Hardening AHS Corp., 5 pages—http://www.ahscorp.com/surfaceh.html.

Takizawa et al. "Synthesis of inorganic materials by 28 GHz MW radiation," Proceed. Of The Symposium On Mw Effects And Applications, Aug. 2, 2001, Kokushikau Univ., Tokyo, Japan, pp. 52-53, (2001).

Taube et al. "Advances in Design of Microwave Resonance Plasma Source," American Institute of Chemical Engineering, 2004 Annual Meeting, Presentation (Nov. 2004).

testMAS: Pressure Sintering, 11 pages—http://cybercut.berkley.edu/mas2/processes/sinter_pressure.

The Amazing Metal Sponge: Simulations of Palladium-Hydride, Design of New Materials, 3 pages—http://www.psc.edu/science/Wolf/Wolf.html.

Toyota Motor Sales, "Emission Sub Systems—Catalytic Converter," 10 pages.

Uchikawa et al., "New Technique of Activating Palladium Surface for Absorption of Hydrogen or Deuterium," *Japanese Journal of Applied Physics*, vol. 32 (1993), pp. 5095-5096, Part 1, No. 11A (Nov. 1993).

Wang et al., "Densification of Al2O3 Powder Using Spark Plasma Sintering," *J. Mater. Res.*, 15:4, pp. 982-987 (Apr. 2000).

Way et al., "Palladium/Copper Allow Composite Membranes for High Temperature Hydrogen Separation from Coal-Derived Gas Streams," Dept. of Chemical Engineering, Colorado School of Mines, 3 pages (1999).

Welding Breakthrough: Generating and Handling a Microwave Powered Plasma, Australian Industry News, Information & Suppliers, 7 pages (Sep. 2001)—http://www.industry/search.com.au/features/microwave.asp.

Welding Plastic Parts, Business New Publishing Company, 4 pages (Nov. 2002)—http://www.assemblymag.com/Common/print_article.asp?rID=E455512C17534C31B96D.

Xie et al., "Effect of Rare Earth in Steel on Thermochemical Treatment," Xiuou Jinshu Cailiao Yu Gongcheng, 26(1), pp. 52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jun. 26, 2003, in PCT/US03/14037.

International Search Report issued on Jul. 8, 2003, in PCT/US03/14124.

International Search Report issued on Jun. 24, 2003, in PCT/US03/14132.

International Search Report issued on Jul. 29, 2003, in PCT/US03/14052.

International Search Report issued on Jul. 29, 2003, in PCT/US03/14054.

International Search issued on Apr. 27, 2004, in PCT/US03/14036.

International Search Report issued on Aug. 21, 2003, in PCT/US03/14053.

International Search Report issued on Feb. 8, 2004, in PCT/US03/14034.

International Search Report issued on Aug. 29, 2003, in PCT/US03/14039.

International Search Report issued on Aug. 21, 2003, in PCT/US03/14038.

International Search Report issued on Aug. 24, 2003, in PCT/US03/14133.

International Search Report issued on Jul. 28, 2003, in PCT/US03/14035.

International Search Report issued on Jun. 27, 2003, in PCT/US03/14040.

International Search Report issued on Jul. 17, 2003, in PCT/US03/14134.

International Search Report issued on Jun. 27, 2003, in PCT/US03/14122.

International Search Report issued on Jun. 24, 2003, in PCT/US03/14130.

International Search Report issued on Apr. 30, 2004, in PCT/US03/14055.

International Search Report issued on Apr. 30, 2004, in PCT/US03/140137.

International Search Report issued on Aug. 21, 2003, in PCT/US03/14123.

International Search Report issued on Jul. 29, 2003, in PCT/US03/14121.

International Search Report issued on Aug. 24, 2003, in PCT/US03/14136.

International Search Report issued on May 3, 2004, in PCT/US03/14135.

Written Opinion issued on Apr. 13, 2004, in PCT/US03/014037.

Examination Report issued on Feb. 24, 2004, in PCT/US03/14054.

Written Opinion issued on Dec. 22, 2003, in PCT/US03/14053.

Examination Report issued on Apr. 26, 2004, in PCT/US03/14053.

Written Opinion issued on Dec. 22, 2003, in PCT/US03/14123.

Examination Report issued on Apr. 26, 2004, in PCT/US03/14123.

Quayle Action issued on Apr. 19, 2005, in U.S. Appl. No. 10/449,600.

Quayle Action issued on Apr. 19, 2004, in U.S. Appl. No. 10/430,414.

Office Action issued on May 18, 2004, in U.S. Appl. No. 10/430,426.

Reply to Office Action filed on Nov. 18, 2004, U.S. Appl. No. 10/430,426.

Office Action issued on Feb. 24, 2005, in U.S. Appl. No. 10/430,426.

Accentus Corporate Overview, 3 pages—http://www.accentus.co.uk/ipco/html/techenv6_txt_fr.html (2003).

Agrawal et al., "Grain Growth Control in Microwave Sintering of Ultrafine WC-Co Composite Powder Compacts," Euro PM99 Conference, Sintering, Turino, Italy, 8 pages (1999).

Agrawal, "Metal Parts from Microwaves," *Materials World* 7(11):672-673 (1999).

Agrawal et al., "Microwave Sintering of Commercial WC/Co Based Hard Metal Tools," Euro PM99 Conference, Sintering, Turino, Italy, 8 pages (1999).

Agrawal, "Microwave Processing of Ceramics," *Current Opinion in Solid State and Materials Science* 3:480-485 (Oct. 1998).

Air Liquide, "Heat Treatment—Gas Quenching,"—http://www.airliquide.com/en/business/industry/metals/applications/heat_treatment/quenching.asp, 1 page (2000).

Alexander et al., "Electrically Conductive Polymer Nanocomposite Materials," AFRL's Materials and Manufacturing Directorate, Nonmetallic Materials Division, Polymer Branch, Wright-Patterson AFB OH—http://www.afrlhorizons.com/Briefs/Sept02/ML0206.html, 2 pages (Sep. 2002).

Al-Shamma'a et al., "Microwave Atmospheric Plasma for Cleaning Exhaust Gases and Particulates," Future Car Congress, Washington, Jun. 3-5, 2002 (1page).

Alton et al., "A High-Density, RF Plasma-Sputter Negative Ion Source," The 8th Intl. Conf. on Heavy-Ion Accelerator Technology, Argonne Natl. Lab., Oct. 5-9, 1998, Poster Presentation (3 pages).

Anklekar et al., "Microwave Sintering and Mechanical Properties of PM Copper Steel," *Powder Metallurgy* 44(4):355-362 (2001).

Batanov et al., "Plasmachemical Deposition of Thin Films in a Localized Free-Space Microwave Discharge," *Technical Physics* 38(6):475-479 (Jun. 1993).

"Carbonitriding," Treat All Metals, Inc., 2 pages—http://www.treatallmetals.com/carbon.htm.

"Carburizing," Treat All Metals, Inc.—http://www.treatallmetals.com/gas.htm, 2 pages.

Cheng, J., "Fabricating Transparent Ceramics by Microwave Sintering," *Am. Ceramic Soc. Bull.* 79(9):71-74 (2000).

Cheng et al., "Microwave Processing of WC-Co Composites And Ferroic Titanates" *Mat. Res. Innovat.* 1(1):44-52 (Jun. 1997).

Circle Group Holdings, Inc., "StarTech Environmental Corp."—http://www.crgq.com/cgiweb/HTML/eMentor_Companies/startech.html, 9 pages.

"Classification of Cast Iron"—Key to Steel—Article—http://www.key-to-steel.com/Articles/Art63.htm, 3 pages (1999).

Collin, in: *Foundations for Microwave Engineering*, 2d Ed., IEEE Press, NY, pp. 180-192 (2001).

"Controlled Atmospheres Sinter-Hardening,," Sarnes Ingenieure, 2 pages, http://www.space-ctrl.de/de/2002/06/399.php (2002).

Egashira et al., "Decomposition of Trichloroethylene by Microwave-Induced Plasma Generated from SiC Whiskers," *J. Electrochem. Soc.*, 145(1):229-235 (Jan. 1998).

Ford 1.3L Catalytic Converter (1988-1989) product description—http://catalyticconverters.com/FO13L43778889.html, 1 page, Undated.

Ford Contour Catalytic Converter (1995-1996) product description—http://www.all-catalytic-converters.com/ford-contour-converter.html, 2 pages, Undated.

Fraunhofer ILT, "Plasma-Reactors for Aftertreatment of Automobile Exhaust Gas," Fraunhofer-Gesellschaft—http://www.ilt.fhg.de/eng/jb01-s35.html, 1 page (2002).

French, "The Plasma Waste Converter—From Waste Disposal to Energy Creation," The International Chemical Weapons Demilitarization Conference, Gifu City, Japan (May 22-24, 2001)—http://www.arofe.army.mil/Conferences/CWC2001/French.htm, 1 page.

Gao et al., "Superfast Densification of Oxide/Oxide Ceramic Composites," J. Am. Ceram. Soc. 82(4)1061-1063 (1999).

Gedevanishvili et al., "Microwave Combustion Synthesis And Sintering of Intermetallics and Alloys," J. Mat. Sci. Lett. 18(9):665-668 (1999).

General Eastern, "Semiconductor Manufacturing—Using the HygroTwin 2850 to Reduce Costs, Improve Quality,", 3 pages, www.generaleastern.net (1997).

George, "The Catalytic Converter," 5 pages, (2002)—http://krioma.net/articles/Catalytic%20Converter/Catalytic%20Converter.htm.

GlassTesseract.Org website, "Tech Procedures and Tips: Exhaust Manifolds and Catalytic Converters Removal—and Installation", 4 pages (2003). http://glasstesseract.org/tech/catalytic.html.

Hackh's *Chemical Dictionary*, 3rd edition, J. Grant, Ed., McGraw Hill Book Co., NY, pp. 174-175 (1944).

"Heat Treatment of Steels—The Processes," AZoM.com, 9 pages, (2002)—www.azom.com.

"Powder Metallurgy—Overview of the Powder Metallurgy Process," AZoM.com, 3 pages (2002)—http://www.azom.com/details.asp?ArticleID=1414.

Honda Automobile News Press Release, "Honda Introduces Its First Two Clean Air Vehicles, the Civic Ferio LEV and Partner 1.6 LEV," 3 pages (Feb. 1997)—http://world.honda.com/news/1997/4970217a.html.

Honda Civic CX Catalytic Converter, (1996-2000) 1 page—http://www.catalyticconverters.com/HOCIVICCX4349600.html, Undated.

"How A Blast Furnace Works—The Blast Furnace Plant," AISI Learning Center, 7 pages. http://www.steel.org/learning/howmade/blast_furnace.htm., Undated.

"How Is Steel Made," Answer Discussion, 6 pages—http://ourworld.compuserve.com/homepages/Dyaros/stlmanuf.htm, Undated.

Hsu et al., "Palladium-Coated Kieselguhr for Simultaneous Separation and Storage of Hydrogen," Westinghouse Savannah River Company, U.S. Dept. of Commerce, National Technical Information Service, 14 pages (2001).

Fincke, "Hydrogen Separation Membrane,—Advanced Gas Separation: H2 Separation," Summary of research proposal, 1 page (2003).

"IRC in Materials Processing: Advanced Melting, Atomisation, Powder and Spray Forming, Plasma Meeting—Operation of a Plasma Furnace," University of Birmingham website, 3 pages—http://www.irc.bham.ac.uk/theme1/plasma/furnace.htm, Undated.

Saville, in: *Iron and Steel*, Chapter 6, pp. 16-22, Wayland Publ., England (1976).

Japanese Advanced Environment Equipment, "Mitsubishi Graphite Electrode Type Plasma Furnace," 3 pages, Undated—http://nett21.unep.or.jp/JSIM_DATA/WASTE/WASTE_3/html/Doc_467.html.

Johnson, Faculty Biography webpage, Dept. of Materials Science & Engineering, Northwestern University, 2 pages—http://www.matsci.northerwestern.edu/faculty/dlj.html, Undated.

Kalyanaraman et al., "Synthesis and Consolidation of Iron Nanopowders," *NanoStructured Materials* 10(8):1379-1392 (1998).

Karger, Scientific Staff Research Areas for KTP Company, 2 pages (Nov. 2002)—http://wwwfb10.upb.de/KTP/KTP-ENG/Staff/Karger/body_karger.html.

Kong et al., "Nuclear-Energy-Assisted Plasma Technology for Producing Hydrogen," Nuclear Energy Research Initiative Research Proposal, 4 pages (2002).

Lewis, in: Hawley's *Condensed Chemical Dictionary*, 12th ed., pp. 230-232, Van Nostrand Reinhold, NY (1993).

Lucas, "Welding Using Microwave Power Supplies," Faculty webpage,1 page—http://www.liv.ac.uk/EEE/research/cer/project6.htm, Undated.

Luggenholscher et al., "Investigations on Electric Field Distributions in a Microwave Discharge in Hydrogen," Institute fur Laser- und Plasmaphysik, Univsitat Essen, Germany, 4 pages, Undated.

March Plasma Systems, product descriptions,2 pages (2002)—http://www.marchplasma.com/micro_app.htm, Undated.

"Micro-fabricated Palladium-Silver Membrane for Hydrogen Separation and Hydro/Dehydrogenation Reactions," Research Education Group webpage, 5 pages—http://utep.el.utwente.nl/tt/projects/sepmem/—Undated.

Ahmed et al., "Microwave Joining of Alumina and Zirconia Ceramics," IRIS Research Topics 1998, 1 page (1988).

"Microwave Welding," EWi WeldNet, 1 page—(2003) http://www.ferris.edu/cot/accounts/plastics/ htdocs/Prey/Microwave%20Homepage.htm.

"Microwave Welding of Plastics," TWI World Centre for Materials Joining Technology, 2 pages, (Aug. 2002)—http://www.twi.co.uk/j32k/protected/band_3/ksab001.htm.

"Microwave Welding," Welding and Joining Information Network, 3 pages (Nov. 2002)—http://www.ewi.org/technologies/plastics/microwave.asp.

Moss et al., "Experimental Investigation of Hydrogen Transport Through Metals," Experiment Description, Los Alamos National Library, 5 pages—Undated. http://www.education.lanl.gov/RESOURCES/h2/dye/education.html.

"Nitriding," Treat All Metals, Inc., 2 pages—Undated—http://www.treatallmetals.com/nitrid.htm.

Thomas et al., "Non-Thermal Plasma Aftertreatment of Particulates—Theoretical Limits and Impact on Reactor Design," SAE Spring Fuels and Lubes Conference, Paris, France, 27 pages—Jun. 19-22, 2000—http://www.aeat.co.uk/electrocat/sae/saepaper.htm.

"Using Non-Thermal Plasma Reactor to Reduce NOx Emissions from CIDI Engines," Office of Energy Efficiency and Renewable Energy, Office of Transportation, 1 page (Apr. 1999).

"Optoelectronic Packaging Applications," March Plasma Systems, Product Description, 2 pages (2002)—http://www.marchplasma.com/opto_app.htm.

Paglieri et al., "Palladium Alloy Composite Membranes for Hydrogen Separation," 15th Annual Conf. Fossil Energy Matter, Knoxville, TN (2001), 5 pages.

Peelamedu et al., "Anisothermal Reaction Synthesis of Garnets, Ferrites, and Spinels In Microwave Field," *Materials Research Bulletin* 36:2723-2739 (Dec. 2001).

PerfectH2 PE8000 Series Product Description, Palladium Diffusion Hydrogen Purifier For High Flow Rate MOCVD Applications, Matheson Tri.Gas, 2 pages (2002).

Photonics Directory, Definition for Thyratron, (Laurin Publishing), 2 pages http://www.photonics.com/dictionary/.

Pingel, "About What Every P/A Should Know About P/M," Powder Metallurgy Co., 9 pages—http://www.powdermetallurgyco.com/pm_about.htm.

"Plasma Applications," Coalition for Plasma Science, 2 pages (1999, 2000)—http://www.plasmacoalition.org/applications.htm.

"Plasma Carburizing," 1 page—Undated, http://www.ndkinc.co.jp/ndke04.html.

"Plasma Direct Melting Furnace," Materials Magic, Hitachi Metals Ltd., 3 pages—Undated, http://www.hitachi-metals.co.jp/e/prod/prod07/p07_2_02.html.

"Classical Plasma Applications," 2 pages (2002)—http://www.plasma.iinpe.br/English/Classical_Applications.htm.

"Plasma Nitride Process Description," Northeast Coating Technologies, 2 pages, Undated, www.northeastcoating.com.

Plasma Science and Technology, "Plasmas for Home, Business and Transportation," 4 pages—Undated. http://www.plasmas.org/rothome.htm.

"Novel Plasma Catalysts Significantly Reduce NOx from Diesel Engines," US Department of Energy research summary, 2 pages (Apr. 2001)—http://www.ott.doe.gov/success.html.

"Printed Circuit Board (PCB) Plasma Applications," March Plasma Systems product descriptions, 2 pages (2002)—http://www.marchplasma.com/pcb_app.01.htm.

Roy et al., "Definitive Experimental Evidence for Microwave Effects: Radically New Effects of Separated E and H Fields, Such As Decrystallization of Oxides in Seconds," *Materials Research Innovations* 6(3):129-140 (2002).

Roy et al., "Full Sintering of Powdered-Metal Bodies In A Microwave Field," *Nature* 399:668-670 (Jun. 17, 1999).

Roy et al., "Major phase transformations and magnetic property changes caused by electromagnetic fields at microwave frequencies," *J. Mat. Res.* 17(12):3008-3011 (2002).

Roy et al., "Microwave Processing: Triumph of Applications-Driven Science in WC-Composites And Ferroic Titanates," *Ceramic Transactions* 80:3-26, (1997).

Rusanov, Introduction to the Hydrogen Energy & Plasma Technologies Institute: Russian Research Centre Kurchatov Institute, 13 pages, Undated—http://www.kiae.ru/eng/str/ihept/oiivept.htm.

Samant et al., "Glow Discharge Plasma Nitriding of Al 6063 Samples and Study of Their Surface Hardness," *Metallofiz. Noveishe Tekhnol.* 23(3):325-333 (2001).

Sato et al., "Surface Modification of Pure Iron by rf Plasma Nitriding with dc Bias Voltage Impression," *Hyomen Gijutsu* 48(3):317-323 (1997) (English Abstract).

Saveliev et al., "Effect of Cathode End Caps and a Cathode Emmissive Surface on Relativistic Magnetron Operation," *IEEE Transactions on Plasma Science* 28:3.478-484 (Jun. 2000).

SC/Tetra Engine Manifold Application, 2 pages (2001)—http://www.sctetra.com/applications/01_manifold.htm.

Shulman, "Microwaves In High-Temperature Processes," GrafTech Intl. Ltd., 8 pages (Mar. 2003) http://www.industrialheating.com/CDA/ArticleInformation/features/BNP_Features_Item/0,2832,94035,00.html.

Slone et al., "NOx Reduction For Lean Exhaust Using Plasma Assisted Catalysis," Noxtech Inc., 5 pages (2000)—http://www.osti.gov/fcvt/deer2000/bhttpa.pdf.

Stockwell Rubber Company, Inc., "Conductive Silicone Rubber Compounds Product Selection Guide," Electrically Conducive Materials Chart, 3 pages, Undated—http://www.stockwell.com/electrically_conducive_produc.htm.

Sumitomo Heavy Industries, Ltd., "Spark Plasma Sintering," 3 pages (2001)—http://www.shi.co.jp/sps/eng/.

"Surface Hardening" Services Description for AHS Corp., 5 pages, Undated—http://www.ahscorp.com/surfaceh.html.

Takizawa et al. "Synthesis of inorganic materials by 28 GHz Microwave Irradiation," *Transactions of the Materials Research Society of Japan* 27(1):51-54 (2002).

Taube et al., "Advances in Design of Microwave Resonance Plasma Source," American Institute of Chemical Engineering, 2004 Annual Meeting, Presentation (Nov. 2004).

"testMAS: Pressure Sintering," 11 pages, Undated—http://cybercut.berkley.edu/mas2/processes/sinter_pressure.

Wolf et al., "The Amazing Metal Sponge: Simulations of Palladium-Hydride," 2 pages, Undated—http://www.psc.edu/science/Wolf/Wolf.html.

Toyota Motor Sales, "Emission Sub Systems—Catalytic Converter," 10 pages, Undated.

Uchikawa et al., "New Technique of Activating Palladium Surface for Absorption of Hydrogen or Deuterium," *Japanese J. Appl. Phys.* 32:5095-5096, Part 1, No. 11A (Nov. 1993).

Wang et al., "Densification of $Al_2O_3$ Powder Using Spark Plasma Sintering," *J. Mater. Res.*, 15(4):982-987 (Apr. 2000).

Way et al., "Palladium/Copper Alloy Composite Membranes for High Temperature Hydrogen Separation from Coal-Derived Gas Streams," Research Grant Report, Dept. of Chemical Engineering, Colorado School of Mines, 3 pages (1999).

Lucas, "Welding Breakthrough: Generating and Handling a Microwave Powered Plasma," Australian Industry News, Information & Suppliers, 7 pages (Sep. 2001)—http://www.industry/search.com.au/features/microwave.asp.

"Welding Plastic Parts," Business New Publishing Company, 4 pages (Nov. 2000)—http://www.assemblymag.com/Common/print_article.asp?rID=E455512C17534C31B96D.

Xie et al., "Effect of Rare Earths in Steels on the Thermochemical Treatments and the Functional Mechanisms of the Rare Earths," *Rare Metals Materials and Engineering* 26(1):52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jul. 23, 2003, in PCT/US03/14037.

International Search Report issued on Aug. 15, 2003, in PCT/US03/14124.

International Search Report issued on Sep. 10, 2003, in PCT/US03/14132.

International Search Report issued on Aug. 14, 2003, in PCT/US03/14052.

International Search Report issued on Aug. 14, 2003, in PCT/US03/14054.

International Search Report issued on May 10, 2004, in PCT/US03/14036.

International Search Report issued on Aug. 9, 2003, in PCT/US03/14053.

International Search Report issued on Feb. 25, 2004, in PCT/US03/14034.

International Search Report issued on Sep. 19, 2003, in PCT/US03/14039.

International Search Report issued on Aug. 29, 2003, in PCT/US03/14038.

International Search Report issued on Dec. 30, 2003, in PCT/US03/14133.

International Search Report issued on Aug. 28, 2003, in PCT/US03/14035.

International Search Report issued on Jul. 29, 2003, in PCT/US03/14040.

International Search Report issued on Sep. 10, 2003, in PCT/US03/14134.

International Search Report issued on Aug. 29, 2003, in PCT/US03/14122.

International Search Report issued on Sep. 30, 2003, in PCT/US03/14130.

International Search Report issued on May 24, 2004, in PCT/US03/14055.

International Search Report issued on May 26, 2004, in PCT/US03/14137.

International Search Report issued on Aug. 29, 2003, in PCT/US03/14123.

International Search Report issued on Aug. 29, 2003, in PCT/US03/14121.

International Search Report issued on Sep. 16, 2003, in PCT/US03/14136.

International Search Report issued on May 25, 2004, in PCT/US03/14153.

Written Opinion issued on Apr. 13, 2004, in PCT/US03/014037.
Examination Report issued on Feb. 24, 2004, in PCT/US03/14054.
Written Opinion issued on Dec. 22, 2003, in PCT/US03/14053.
Examination Report issued on Apr. 26, 2004, in PCT/US03/14053.
Written Opinion issued on Dec. 22, 2003, in PCT/US03/14123.
Examination Report issued on Apr. 26, 2004, in PCT/US03/14123.
Quayle Action issued on Apr. 19, 2004, in U.S. Appl. No. 10/430,414.
Office Action issued on May 18, 2004, in U.S. Appl. No. 10/430,426.
Reply to Office Action filed on Nov. 18, 2004, on U.S. Appl. No. 10/430,426.
Office Action issued on Feb. 24, 2005, in U.S. Appl. No. 10/430,426.
Willert-Porada, M., "Alternative Sintering Methods" 1 page Abstract dated Nov. 8, 2001, http://www.itap.physik.uni-stuttgart.de/~gkig/neu/english/welcome.php?/~gkig/neu/abstracts/abstract_willert-porada.html.

\* cited by examiner

PLASMA-ASSISTED PROCESSING IN A MANUFACTURING LINE

CROSS-REFERENCE OF RELATED APPLICATIONS

Priority is claimed to U.S. Provisional Patent Application No. 60/378,693, filed May 8, 2002, No. 60/430,677, filed Dec. 4, 2002, and No. 60/435,278, filed Dec. 23, 2002, all of which are fully incorporated herein by reference.

FIELD OF THE INVENTION

This invention relates to methods and apparatus for plasma-assisted processing of work pieces in a manufacturing line.

BACKGROUND OF THE INVENTION

Plasmas can be used to assist in a number of processes, including the joining and heat-treating of materials. However, igniting, modulating, and sustaining plasmas for these purposes can be difficult for a number of reasons.

For example, it is known that a plasma can be ignited in a cavity by directing a large amount of microwave radiation into the cavity containing a gas. If the radiation intensity is large enough, the plasma can ignite spontaneously. However, radiation sources capable of supplying such large intensities can have several disadvantages; they can be expensive, heavy, bulky, and energy-consuming. Moreover, these large radiation sources normally require large electrical power supplies, which can have similar disadvantages.

One way of igniting a plasma with a lower radiation intensity is to reduce the pressure in the cavity. However, vacuum equipment, which can be used to reduce this pressure, can limit manufacturing flexibility, especially as the plasma chambers become large and especially in the context of manufacturing lines.

A sparking device can also be used to ignite a plasma using a lower radiation intensity. Such a device, however, only sparks periodically and therefore can only ignite a plasma periodically, sometimes causing an ignition lag. Moreover, conventional sparking devices are normally powered with electrical energy, limiting their use and position in many manufacturing environments.

BRIEF SUMMARY OF A FEW ASPECTS OF THE INVENTION

A method of plasma-assisted processing a plurality of work pieces can be provided. In one embodiment, a method of plasma-assisted processing a plurality of work pieces is provided. The method can include sequentially conveying a plurality of work pieces into an irradiation zone, flowing a gas into the irradiation zone, igniting the gas in the irradiation zone to form a plasma, sustaining the plasma for a period of time sufficient to at least partially plasma process at least one of the work pieces in the irradiation zone, and sequentially conveying the plurality of work pieces out of the irradiation zone.

In another embodiment, the method can include placing each of the plurality of work pieces in a plurality of movable carriers, sequentially moving each of the movable carriers on a conveyor into an irradiation zone, flowing a gas into the irradiation zone, igniting the gas in the irradiation zone to form a plasma, sustaining the plasma for a period of time sufficient to at least partially plasma process at least one of the work pieces in the irradiation zone, and advancing the conveyor to move the at least one plasma-processed work piece out of the irradiation zone.

Apparatus for plasma-assisted processing a plurality of work pieces may also be provided. In one embodiment, an apparatus can include a radiation source, a radiation housing through which radiation passes from the source, a conveyor for sequentially moving the work pieces into and out of an irradiation zone adjacent the housing in the presence of a plasma. The apparatus may also include a gas inlet for conveying gas into the irradiation zone to enable plasma formation in the irradiation zone.

A plasma catalyst for initiating, modulating, and sustaining a plasma is also provided. The catalyst can be passive or active. A passive plasma catalyst can include any object capable of inducing a plasma by deforming a local electric field (e.g., an electromagnetic field) consistent with this invention, without necessarily adding additional energy. An active plasma catalyst, on the other hand, is any particle or high energy wave packet capable of transferring a sufficient amount of energy to a gaseous atom or molecule to remove at least one electron from the gaseous atom or molecule in the presence of electromagnetic radiation. In both cases, a plasma catalyst can improve, or relax, the environmental conditions required to ignite a plasma.

Additional plasma catalysts, and methods and apparatus for igniting, modulating, and sustaining a plasma for producing a gas consistent with this invention are also provided.

BRIEF DESCRIPTION OF THE DRAWINGS

Further aspects of the invention will be apparent upon consideration of the following detailed description, taken in conjunction with the accompanying drawings, in which like reference characters refer to like parts throughout, and in which.

DETAILED DESCRIPTION OF THE EMBODIMENTS

This invention relates to methods and apparatus for plasma-assisted processing in a manufacturing line and can be used to lower energy costs and increase manufacturing flexibility.

The following commonly owned, concurrently filed U.S. patent applications are hereby incorporated by reference in their entireties: U.S. patent application Ser. No. 10/513,229, U.S. patent application Ser. No. 10/513,313, PCT Application US03/14132, now expired, U.S. patent application Ser. No. 10/513,394, U.S. patent application Ser. No. 10/513,607, U.S. patent application Ser. No. 10/449,600, PCT Application US03/14034, now expired, U.S. patent application Ser. No. 10/430,416, U.S. patent application Ser. No. 10/430,415, PCT Application US03/14133, now expired, U.S. patent application Ser. No. 10/513,606, U.S. patent application Ser. No. 10/513,309, U.S. patent application Ser. No. 10/513,220, PCT Application US03/14122, now expired, U.S. patent application Ser. No. 10/513,397, U.S. patent application Ser. No. 10/513,605, PCT Application US03/14137, now expired, U.S. patent application Ser. No. 10/430,426, PCT Application US03/14121, now expired, U.S. patent application Ser. No. 10/513,604, and PCT Application US03/14135.

Illustrative Plasma System

Figure 1:
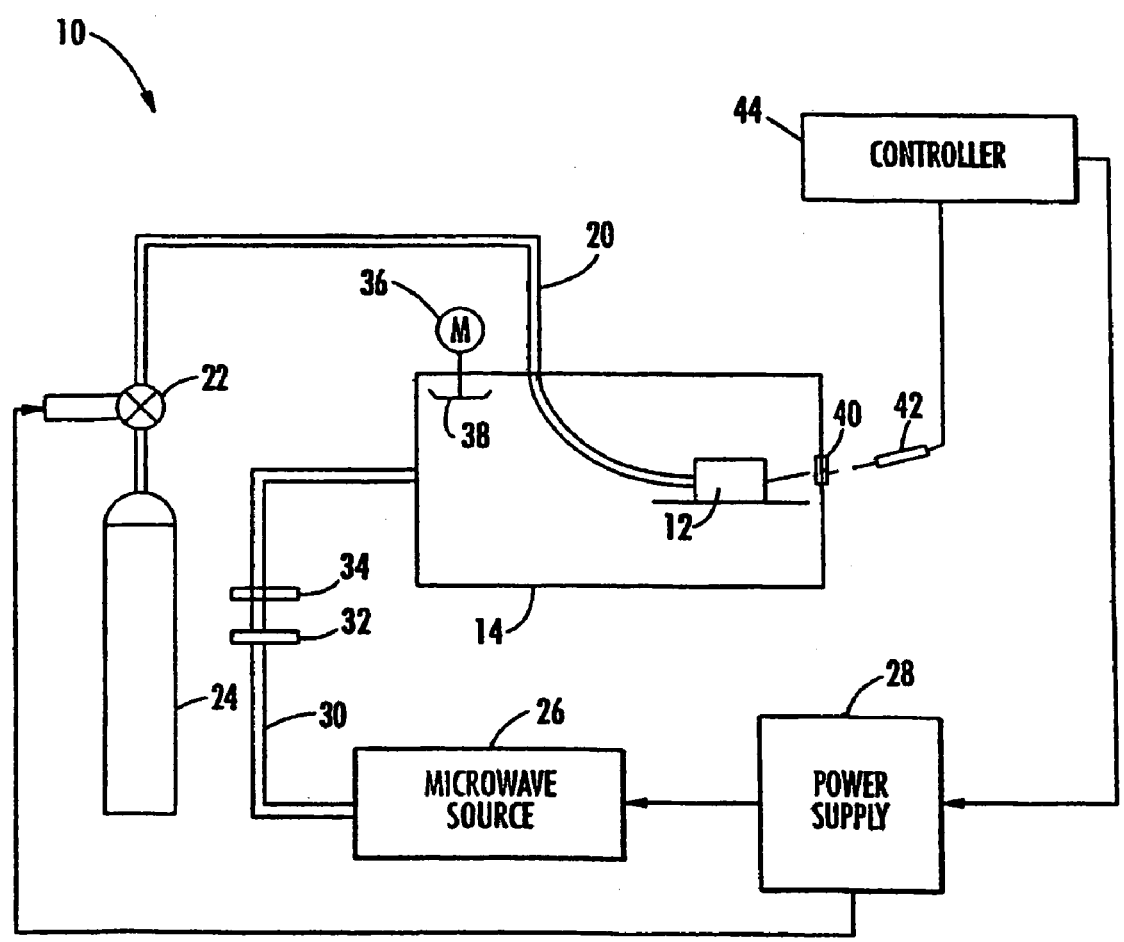
FIG. 1 shows a schematic diagram of an illustrative plasma-assisted gas production system consistent with this invention.

FIG. 1 shows illustrative plasma system 10 consistent with one aspect of this invention. In this embodiment, cavity 12 is formed in a vessel that is positioned inside radiation chamber (i.e., applicator) 14. In another embodiment (not shown), vessel 12 and radiation chamber 14 are the same, thereby eliminating the need for two separate components. The vessel in which cavity 12 is formed can include one or more radiation-transmissive insulating layers to improve its thermal insulation properties without significantly shielding cavity 12 from the radiation. As described more fully below, system 10 can be used to generate a plasma and can be included in a manufacturing line consistent with this invention.

In one embodiment, cavity 12 is formed in a vessel made of ceramic. Due to the extremely high temperatures that can be achieved with plasmas consistent with this invention, a ceramic capable of operating at about 3,000 degrees Fahrenheit can be used. The ceramic material can include, by weight, 29.8% silica, 68.2% alumina, 0.4% ferric oxide, 1% titania, 0.1% lime, 0.1% magnesia, 0.4% alkalies, which is sold under Model No. LW-30 by New Castle Refractories Company, of New Castle, Pa. It will be appreciated by those of ordinary skill in the art, however, that other materials, such as quartz, and those different from the one described above, can also be used consistent with the invention.

In one successful experiment, a plasma was formed in a partially open cavity inside a first brick and topped with a second brick. The cavity had dimensions of about 2 inches by about 2 inches by about 1.5 inches. At least two holes were also provided in the brick in communication with the cavity: one for viewing the plasma and at least one hole for providing the gas. The size of the cavity can depend on the desired plasma process being performed. Also, the cavity can at least be configured to prevent the plasma from rising/floating away from the primary processing region.

Cavity 12 can be connected to one or more gas sources 24 (e.g., a source of argon, nitrogen, hydrogen, xenon, krypton) by line 20 and control valve 22, which may be powered by power supply 28. Line 20 may be tubing (e.g., between about 1/16 inch and about 1/4 inch, such as about 1/8"), but could be any device capable of delivering gas. Also, if desired, a vacuum pump can be connected to the chamber to remove fumes that may be generated during plasma processing. In one embodiment, gas can flow in and/or out of cavity 12 through one or more gaps in a multi-part vessel. Thus, gas ports consistent with this invention need not be distinct holes and can take on other forms as well, such as many small distributed holes.

A radiation leak detector (not shown) was installed near source 26 and waveguide 30 and connected to a safety interlock system to automatically turn off the radiation (e.g., microwave) power supply if a leak above a predefined safety limit, such as one specified by the FCC and/or OSHA (e.g., 5 $mW/cm^2$), was detected.

Radiation source 26, which may be powered by electrical power supply 28, can direct radiation energy into chamber 14 through one or more waveguides 30 or by using a coaxial cable. It will be appreciated by those of ordinary skill in the art that source 26 can be connected directly to cavity 12 or chamber 14, thereby eliminating waveguide 30. The radiation energy entering cavity 12 is used to ignite a plasma within the cavity. This plasma can be substantially sustained and confined to the cavity by coupling additional radiation with the catalyst Radiation energy can be supplied through circulator 32 and tuner 34 (e.g., 3-stub tuner). Tuner 34 can be used to minimize the reflected power as a function of changing ignition or processing conditions, especially after the plasma has formed because microwave power, for example, will be strongly absorbed by the plasma.

As explained more fully below, the location of radiation-transmissive cavity 12 in chamber 14 may not be critical if chamber 14 supports multiple modes, and especially when the modes are continually or periodically mixed. As also explained more fully below, motor 36 can be connected to mode-mixer 38 for making the time-averaged radiation energy distribution substantially uniform throughout chamber 14. Furthermore, window 40 (e.g., a quartz window) can be disposed in one wall of chamber 14 adjacent to cavity 12, permitting temperature sensor 42 (e.g., an optical pyrometer) to be used to view a process inside cavity 12. In one embodiment, the optical pyrometer output can increase from zero volts as the temperature rises to within the tracking range.

Sensor 42 can develop output signals as a function of the temperature or any other monitorable condition associated with a work piece (not shown) within cavity 12 and provide the signals to controller 44. Dual temperature sensing and heating, as well as automated cooling rate and gas flow controls can also be used. Controller 44 in turn can be used to control operation of power supply 28, which can have one output connected to source 26 as described above and another output connected to valve 22 to control gas flow into cavity 12.

The invention may be practiced with microwave sources at, for example, both 915 MHz and 2.45 GHz provided by Communications and Power Industries (CPI), although radiation having any frequency less than about 333 GHz can be used. The 2.45 GHz system provided continuously variable microwave power from about 0.5 kilowatts to about 5.0 kilowatts. A 3-stub tuner allowed impedance matching for maximum power transfer and a dual directional coupler was used to measure forward and reflected powers. Also, optical pyrometers were used for remote sensing of the sample temperature.

As mentioned above, radiation having any frequency less than about 333 GHz can be used consistent with this invention. For example, frequencies, such as power line frequencies (about 50 Hz to about 60 Hz), can be used, although the pressure of the gas from which the plasma is formed may be lowered to assist with plasma ignition. Also, any radio frequency or microwave frequency can be used consistent with this invention, including frequencies greater than about 100 kHz. In most cases, the gas pressure for such relatively high frequencies need not be lowered to ignite, modulate, or sustain a plasma, thereby enabling many plasma-assisted processes to occur at atmospheric pressures and above in any manufacturing environment.

The equipment was computer controlled using LabView 6i software, which provided real-time temperature monitoring and microwave power control. Noise was reduced by using sliding averages of suitable number of data points. Also, to improve speed and computational efficiency, the number of stored data points in the buffer array were limited by using shift-registers and buffer-sizing techniques. The pyrometer measured the temperature of a sensitive area of about 1 cm$^2$, which was used to calculate an average temperature. The pyrometer sensed radiant intensities at two wavelengths and fit those intensities using Planck's law to determine the temperature. It will be appreciated, however, that other devices and methods for monitoring and controlling temperature are also available and can be used consistent with this invention. For example, control software that can be used consistent with this invention is described in commonly owned, concurrently filed PCT Application US03/14135, now expired, which is hereby incorporated by reference in its entirety.

Chamber 14 had several glass-covered viewing ports with radiation shields and one quartz window for pyrometer access. Several ports for connection to a vacuum pump and a gas source were also provided, although not necessarily used.

System 10 also included a closed-loop deionized water cooling system (not shown) with an external heat exchanger cooled by tap water. During operation, the deionized water first cooled the magnetron, then the load-dump in the circulator (used to protect the magnetron), and finally the radiation chamber through water channels welded on the outer surface of the chamber.

Plasma Catalysts

A plasma catalyst consistent with this invention can include one or more different materials and may be either passive or active. A plasma catalyst can be used, among other things, to ignite, modulate, and/or sustain a plasma at a gas pressure that is less than, equal to, or greater than atmospheric pressure.

One method of forming a plasma consistent with this invention can include subjecting a gas in a cavity to electromagnetic radiation having a frequency less than about 333 GHz in the presence of a passive plasma catalyst. A passive plasma catalyst consistent with this invention can include any object capable of inducing a plasma by deforming a local electric field (e.g., an electromagnetic field) consistent with this invention, without necessarily adding additional energy through the catalyst, such as by applying an electric voltage to create a spark.

A passive plasma catalyst consistent with this invention can also be a nano-particle or a nano-tube. As used herein, the term "nano-particle" can include any particle having a maximum physical dimension less than about 100 nm that is at least electrically semi-conductive. Also, both single-walled and multi-walled carbon nanotubes, doped and undoped, can be particularly effective for igniting plasmas consistent with this invention because of their exceptional electrical conductivity and elongated shape. The nanotubes can have any convenient length and can be a powder fixed to a substrate. If fixed, the nanotubes can be oriented randomly on the surface of the substrate or fixed to the substrate (e.g., at some predetermined orientation) while the plasma is ignited or sustained.

A passive plasma catalyst can also be a powder consistent with this invention, and need not comprise nano-particles or nano-tubes. It can be formed, for example, from fibers, dust particles, flakes, sheets, etc. When in powder form, the catalyst can be suspended, at least temporarily, in a gas. By suspending the powder in the gas, the powder can be quickly dispersed throughout the cavity and more easily consumed, if desired.

Figure 1A:
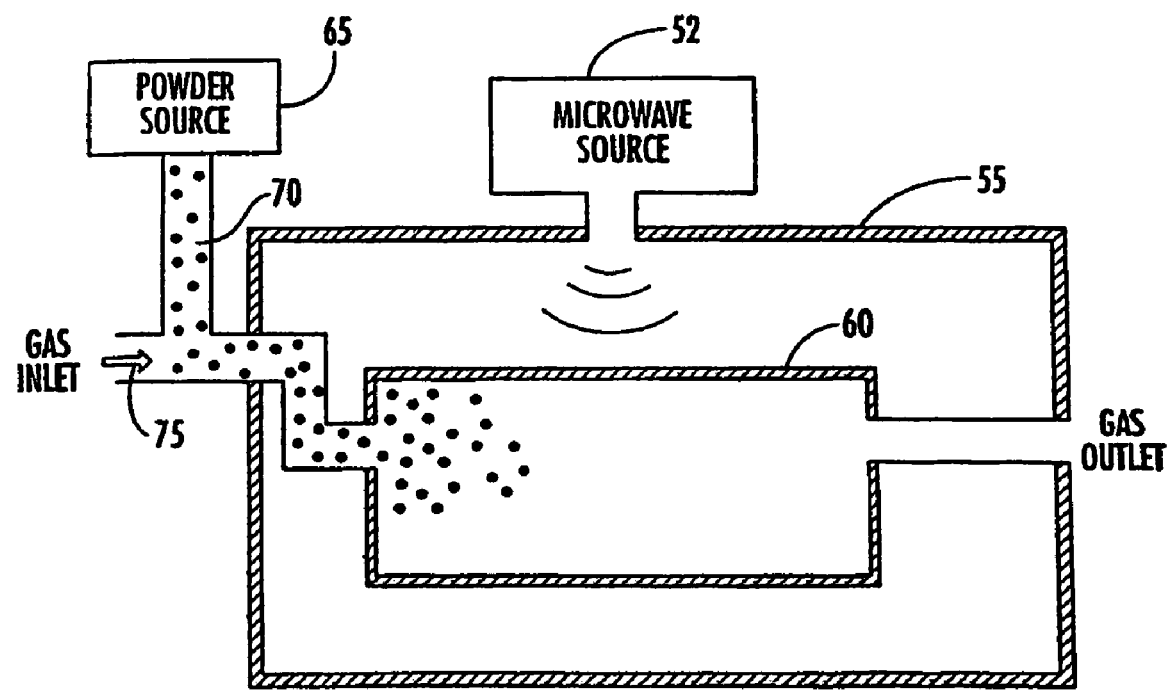
FIG. 1A shows an illustrative embodiment of a portion of a plasma-assisted gas production system for adding a powder plasma catalyst to a plasma cavity for igniting, modulating, or sustaining a plasma in a cavity consistent with this invention.

In one embodiment, the powder catalyst can be carried into the cavity and at least temporarily suspended with a carrier gas. The carrier gas can be the same or different from the gas that forms the plasma. Also, the powder can be added to the gas prior to being introduced to the cavity. For example, as shown in FIG. 1A, radiation source 52 can supply radiation to radiation cavity 55, in which plasma cavity 60 is placed. Powder source 65 can provide catalytic powder 70 into gas stream 75. In an alternative embodiment, powder 70 can be first added to cavity 60 in bulk (e.g., in a pile) and then distributed in the cavity in any number of ways, including flowing a gas through or over the bulk powder. In addition, the powder can be added to the gas for igniting, modulating, or sustaining a plasma by moving, conveying, drilling, sprinkling, blowing, or otherwise, feeding the powder into or within the cavity.

In one experiment, a plasma was ignited in a cavity by placing a pile of carbon fiber powder in a copper pipe that extended into the cavity. Although sufficient radiation was directed into the cavity, the copper pipe shielded the powder from the radiation and no plasma ignition took place. However, once a carrier gas began flowing through the pipe, forcing the powder out of the pipe and into the cavity, and thereby subjecting the powder to the radiation, a plasma was nearly instantaneously ignited in the cavity.

A powder plasma catalyst consistent with this invention can be substantially non-combustible, thus it need not contain oxygen or burn in the presence of oxygen. Thus, as mentioned above, the catalyst can include a metal, carbon, a carbon-based alloy, a carbon-based composite, an electrically conductive polymer, a conductive silicone elastomer, a polymer nanocomposite, an organic-inorganic composite, and any combination thereof.

Also, powder catalysts can be substantially uniformly distributed in the plasma cavity (e.g., when suspended in a gas), and plasma ignition can be precisely controlled within the cavity. Uniform ignition can be important in certain applications, including those applications requiring brief plasma exposures, such as in the form of one or more bursts. Still, a certain amount of time can be required for a powder catalyst to distribute itself throughout a cavity, especially in complicated, multi-chamber cavities. Therefore, consistent with another aspect of this invention, a powder catalyst can be introduced into the cavity through a plurality of ignition ports to more rapidly obtain a more uniform catalyst distribution therein (see below).

In addition to powder, a passive plasma catalyst consistent with this invention can include, for example, one or more microscopic or macroscopic fibers, sheets, needles, threads, strands, filaments, yarns, twines, shavings, slivers, chips, woven fabrics, tape, whiskers, or any combination thereof. In these cases, the plasma catalyst can have at least one portion with one physical dimension substantially larger than another physical dimension. For example, the ratio between at least two orthogonal dimensions can be at least about 1:2, but could be greater than about 1:5, or even greater than about 1:10.

Thus, a passive plasma catalyst can include at least one portion of material that is relatively thin compared to its length. A bundle of catalysts (e.g., fibers) may also be used and can include, for example, a section of graphite tape. In one experiment, a section of tape having approximately thirty thousand strands of graphite fiber, each about 2-3 microns in diameter, was successfully used. The number of fibers in and the length of a bundle are not critical to igniting, modulating, or sustaining the plasma. For example, satisfactory results have been obtained using a section of graphite tape about one-quarter inch long. One type of carbon fiber that has been successfully used consistent with this invention is sold under the trademark Magnamite®, Model No. AS4C-GP3K, by the Hexcel Corporation, of Anderson, S.C. Also, silicon-carbide fibers have been successfully used.

A passive plasma catalyst consistent with another aspect of this invention can include one or more portions that are, for example, substantially spherical, annular, pyramidal, cubic, planar, cylindrical, rectangular or elongated.

The passive plasma catalysts discussed above can include at least one material that is at least electrically semi-conductive. In one embodiment, the material can be highly conductive. For example, a passive plasma catalyst consistent with this invention can include a metal, an inorganic material, carbon, a carbon-based alloy, a carbon-based composite, an electrically conductive polymer, a conductive silicone elastomer, a polymer nanocomposite, an organic-inorganic composite, or any combination thereof. Some of the possible inorganic materials that can be included in the plasma catalyst include carbon, silicon carbide, molybdenum, platinum, tantalum, tungsten, carbon nitride, and aluminum, although other electrically conductive inorganic materials may work just as well.

In addition to one or more electrically conductive materials, a passive plasma catalyst consistent with this invention can include one or more additives (which need not be electrically conductive). As used herein, the additive can include any material that a user wishes to add to the plasma. Therefore, the catalyst can include the additive itself, or it can include a precursor material that, upon decomposition, can form the additive. Thus, the plasma catalyst can include one or more additives and one or more electrically conductive materials in any desirable ratio, depending on the ultimate desired composition of the plasma and the process using the plasma.

The ratio of the electrically conductive components to the additives in a passive plasma catalyst can vary over time while being consumed. For example, during ignition, the plasma catalyst could desirably include a relatively large percentage of electrically conductive components to improve the ignition conditions. On the other hand, if used while sustaining the plasma, the catalyst could include a relatively large percentage of additives. It will be appreciated by those of ordinary skill in the art that the component ratio of the plasma catalyst used to ignite and sustain the plasma could be the same.

A predetermined ratio profile can be used to simplify many plasma processes. In many conventional plasma processes, the components within the plasma are added as necessary, but such addition normally requires programmable equipment to add the components according to a predetermined schedule. However, consistent with this invention, the ratio of components in the catalyst can be varied, and thus the ratio of components in the plasma itself can be automatically varied. That is, the ratio of components in the plasma at any particular time can depend on which of the catalyst portions is currently being consumed by the plasma. Thus, the catalyst component ratio can be different at different locations within the catalyst And, the current ratio of components in a plasma can depend on the portions of the catalyst currently and/or previously consumed, especially when the flow rate of a gas passing through the plasma chamber is relatively slow.

Figure 2:
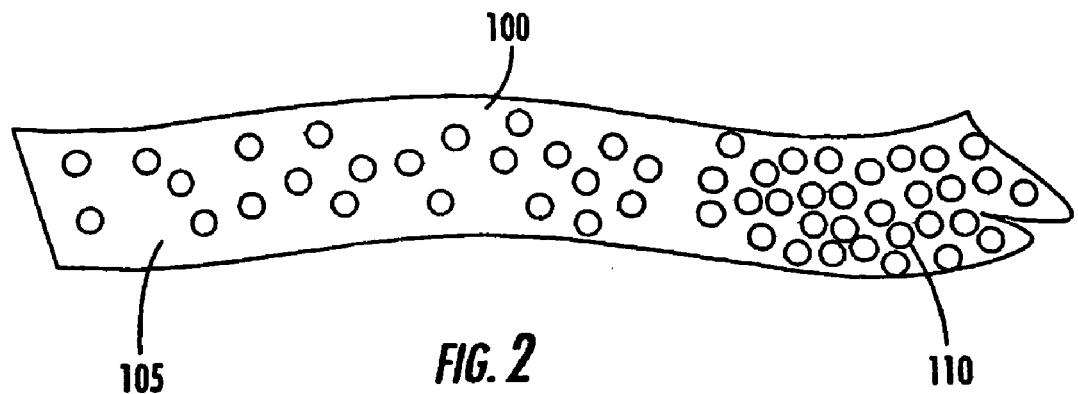
FIG. 2 shows an illustrative plasma catalyst fiber with at least one component having a concentration gradient along its length consistent with this invention.

A passive plasma catalyst consistent with this invention can be homogeneous, inhomogeneous, or graded. Also, the plasma catalyst component ratio can vary continuously or discontinuously throughout the catalyst. For example, in FIG. 2, the ratio can vary smoothly forming a gradient along a length of catalyst 100. Catalyst 100 can include a strand of material that includes a relatively low concentration of a component at section 105 and a continuously increasing concentration toward section 110.

Figure 3:
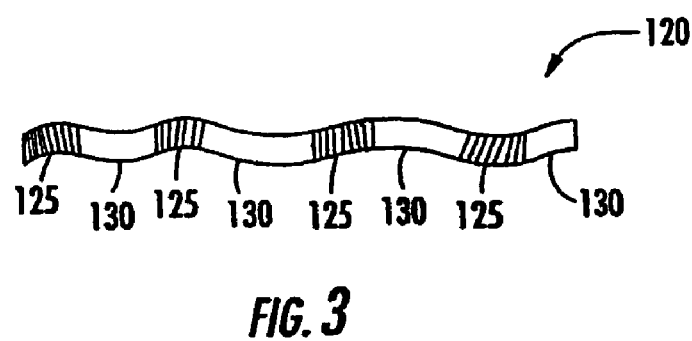
FIG. 3 shows an illustrative plasma catalyst fiber with multiple components at a ratio that varies along its length consistent with this invention.

Alternatively, as shown in FIG. 3, the ratio can vary discontinuously in each portion of catalyst 120, which includes, for example, alternating sections 125 and 130 having different concentrations. It will be appreciated that catalyst 120 can have more than two section types. Thus, the catalytic component ratio being consumed by the plasma can vary in any predetermined fashion. In one embodiment, when the plasma is monitored and a particular additive is detected, further processing can be automatically commenced or terminated.

Another way to vary the ratio of components in a sustained plasma is by introducing multiple catalysts having different component ratios at different times or different rates. For example, multiple catalysts can be introduced at approximately the same location or at different locations within the cavity. When introduced at different locations, the plasma formed in the cavity can have a component concentration gradient determined by the locations of the various catalysts. Thus, an automated system can include a device by which a consumable plasma catalyst is mechanically inserted before and/or during plasma igniting, modulating, and/or sustaining.

Figure 4:
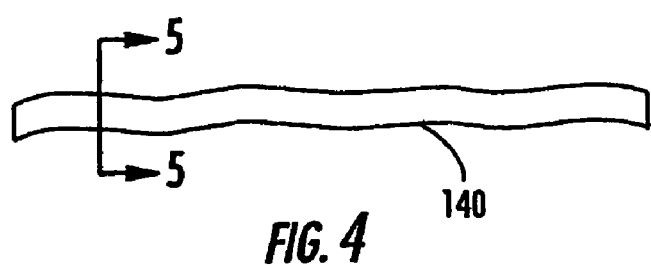
FIG. 4 shows another illustrative plasma catalyst fiber that includes a core under layer and a coating consistent with this invention.
Figure 5:
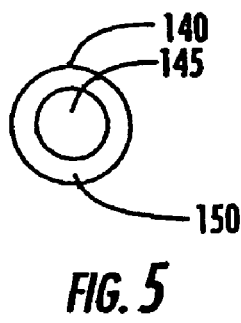
FIG. 5 shows a cross-sectional view of the plasma catalyst fiber of FIG. 4, taken from line 5-5 of FIG. 4, consistent with this invention.

A passive plasma catalyst consistent with this invention can also be coated. In one embodiment, a catalyst can include a substantially non-electrically conductive coating deposited on the surface of a substantially electrically conductive material. Alternatively, the catalyst can include a substantially electrically conductive coating deposited on the surface of a substantially electrically non-conductive material. FIGS. 4 and 5, for example, show fiber 140, which includes underlayer 145 and coating 150. In one embodiment, a plasma catalyst including a carbon core is coated with nickel to prevent oxidation of the carbon.

A single plasma catalyst can also include multiple coatings. If the coatings are consumed during contact with the plasma, the coatings could be introduced into the plasma sequentially, from the outer coating to the innermost coating, thereby creating a time-release mechanism. Thus, a coated plasma catalyst can include any number of materials, as long as a portion of the catalyst is at least electrically semi-conductive.

Consistent with another embodiment of this invention, a plasma catalyst can be located entirely within a radiation cavity to substantially reduce or prevent radiation energy leakage. In this way, the plasma catalyst does not electrically or magnetically couple with the vessel containing the cavity or to any electrically conductive object outside the cavity. This prevents sparking at the ignition port and prevents radiation from leaking outside the cavity during the ignition and possibly later if the plasma is sustained. In one embodiment, the catalyst can be located at a tip of a substantially electrically non-conductive extender that extends through an ignition port.

Figure 6:
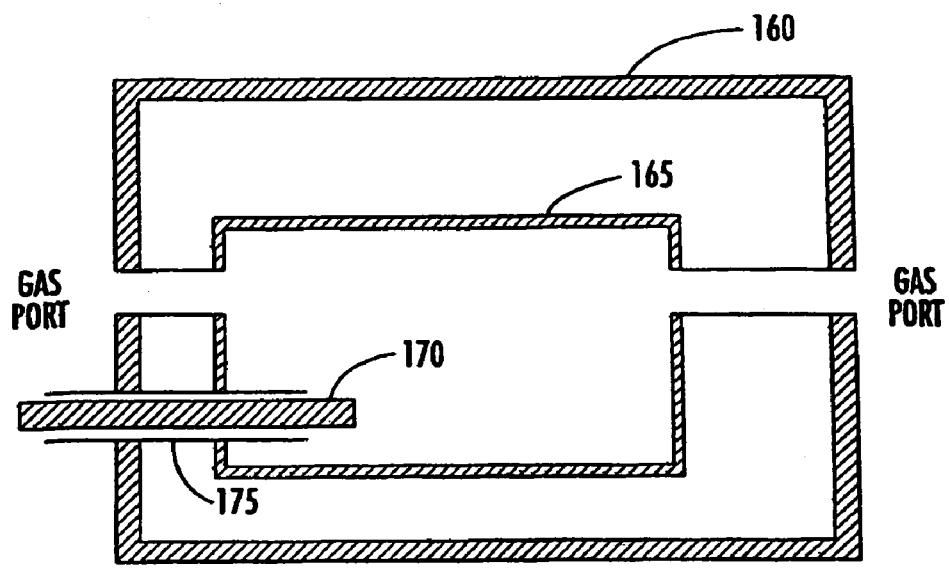
FIG. 6 shows an illustrative embodiment of another portion of a plasma system including an elongated plasma catalyst that extends through ignition port consistent with this invention.
Figure 7:
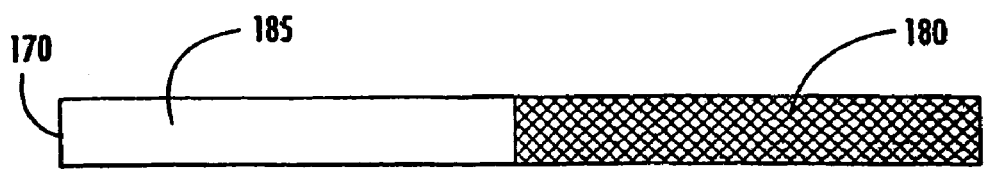
FIG. 7 shows an illustrative embodiment of an elongated plasma catalyst that can be used in the system of FIG. 6 consistent with this invention.

FIG. 6, for example, shows radiation chamber 160 in which plasma cavity 165 is placed. Plasma catalyst 170 is elongated and extends through ignition port 175. As shown in FIG. 7, and consistent with this invention, catalyst 170 can include electrically conductive distal portion 180 (which is placed in chamber 160) and electrically non-conductive portion 185 (which is placed substantially outside chamber 160, but can extend somewhat into chamber 160). This configuration can prevent an electrical connection (e.g., sparking) between distal portion 180 and chamber 160.

Figure 8:
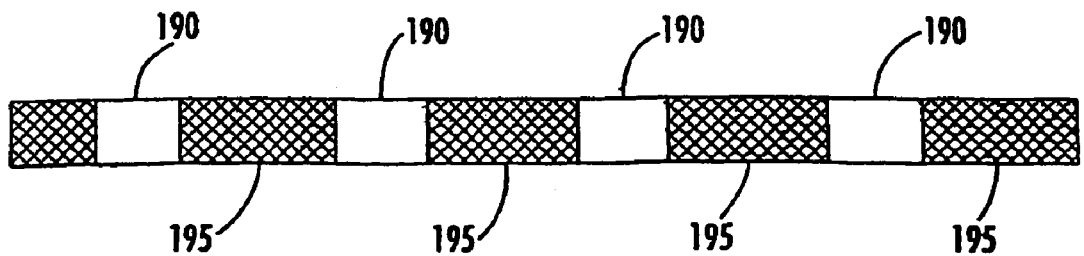
FIG. 8 shows another illustrative embodiment of an elongated plasma catalyst that can be used in the system of FIG. 6 consistent with this invention.

In another embodiment, shown in FIG. 8, the catalyst can be formed from a plurality of electrically conductive segments 190 separated by and mechanically connected to a plurality of electrically non-conductive segments 195. In this embodiment, the catalyst can extend through the ignition port between a point inside the cavity and another point outside the cavity, but the electrically discontinuous profile significantly prevents sparking and energy leakage.

Another method of forming a plasma consistent with this invention includes subjecting a gas in a cavity to electromagnetic radiation having a frequency less than about 333 GHz in the presence of an active plasma catalyst, which generates or includes at least one ionizing particle.

An active plasma catalyst consistent with this invention can be any particle or high energy wave packet capable of transferring a sufficient amount of energy to a gaseous atom or molecule to remove at least one electron from the gaseous atom or molecule in the presence of electromagnetic radiation. Depending on the source, the ionizing particles can be directed into the cavity in the form of a focused or collimated beam, or they may be sprayed, spewed, sputtered, or otherwise introduced.

Figure 9:
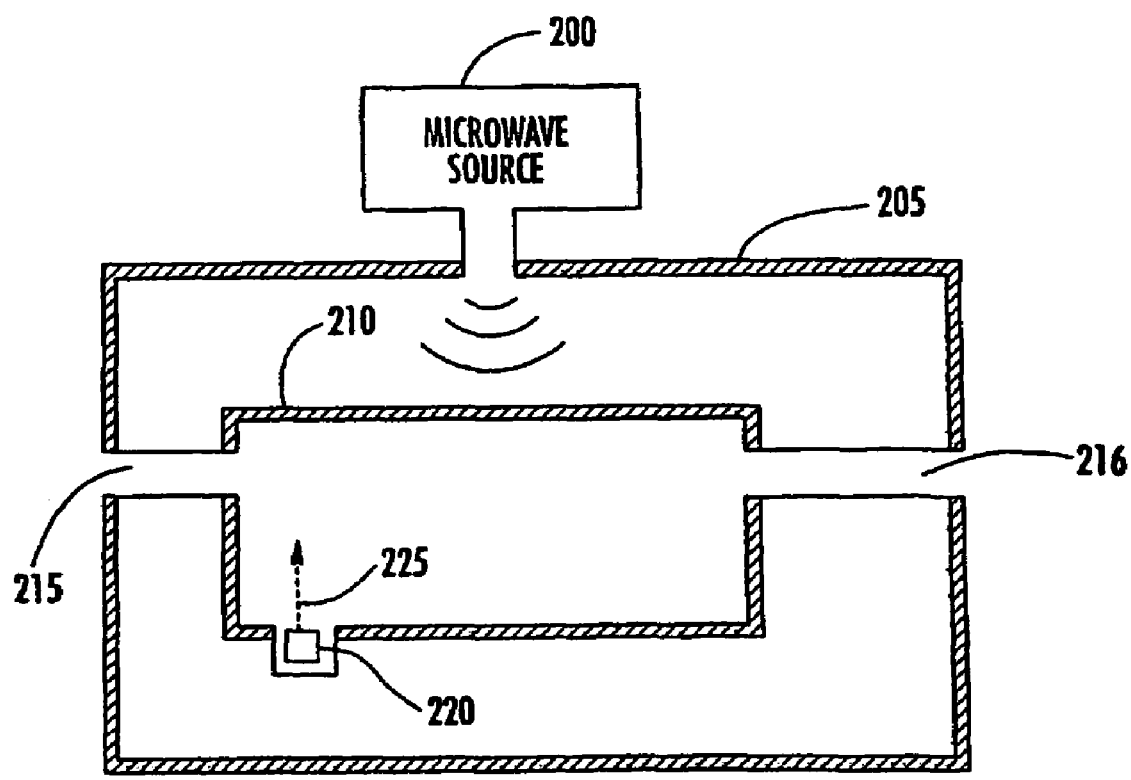
FIG. 9 shows an illustrative embodiment of a portion of a plasma-assisted processing system for directing ionizing radiation into a radiation chamber consistent with this invention.

For example, FIG. 9 shows radiation source 200 directing radiation into radiation chamber 205. Plasma cavity 210 is positioned inside of chamber 205 and may permit a gas to flow therethrough via ports 215 and 216. Source 220 can direct ionizing particles 225 into cavity 210. Source 220 can be protected, for example, by a metallic screen which allows the ionizing particles to pass through but shields source 220 from radiation. If necessary, source 220 can be water-cooled.

Examples of ionizing particles consistent with this invention can include x-ray particles, gamma ray particles, alpha particles, beta particles, neutrons, protons, and any combination thereof. Thus, an ionizing particle catalyst can be charged (e.g., an ion from an ion source) or uncharged and can be the product of a radioactive fission process. In one embodiment, the vessel in which the plasma cavity is formed could be entirely or partially transmissive to the ionizing particle catalyst. Thus, when a radioactive fission source is located outside the cavity, the source can direct the fission products through the vessel to ignite the plasma. The radioactive fission source can be located inside the radiation chamber to substantially prevent the fission products (i.e., the ionizing particle catalyst) from creating a safety hazard.

In another embodiment, the ionizing particle can be a free electron, but it need not be emitted in a radioactive decay process. For example, the electron can be introduced into the cavity by energizing the electron source (such as a metal), such that the electrons have sufficient energy to escape from the source. The electron source can be located inside the cavity, adjacent the cavity, or even in the cavity wall. It will be appreciated by those of ordinary skill in the art that any combination of electron sources is possible. A common way to produce electrons is to heat a metal, and these electrons can be further accelerated by applying an electric field.

In addition to electrons, free energetic protons can also be used to catalyze a plasma. In one embodiment, a free proton can be generated by ionizing hydrogen and, optionally, accelerated with an electric field.

Multi-Mode Radiation Cavities

A radiation waveguide, cavity, or chamber can be designed to support or facilitate propagation of at least one electromagnetic radiation mode. As used herein, the term "mode" refers to a particular pattern of any standing or propagating electromagnetic wave that satisfies Maxwell's equations and the applicable boundary conditions (e.g., of the cavity). In a waveguide or cavity, the mode can be any one of the various possible patterns of propagating or standing electromagnetic fields. Each mode is characterized by its frequency and polarization of the electric field and/or the magnetic field vectors. The electromagnetic field pattern of a mode depends on the frequency, refractive indices or dielectric constants, and waveguide or cavity geometry.

A transverse electric (TE) mode is one whose electric field vector is normal to the direction of propagation. Similarly, a transverse magnetic (TM) mode is one whose magnetic field vector is normal to the direction of propagation. A transverse electric and magnetic (TEM) mode is one whose electric and magnetic field vectors are both normal to the direction of propagation. A hollow metallic waveguide does not typically support a normal TEM mode of radiation propagation. Even though radiation appears to travel along the length of a waveguide, it may do so only by reflecting off the inner walls of the waveguide at some angle. Hence, depending upon the propagation mode, the radiation (e.g., microwave) may have either some electric field component or some magnetic field component along the axis of the waveguide (often referred to as the z-axis).

The actual field distribution inside a cavity or waveguide is a superposition of the modes therein. Each of the modes can be identified with one or more subscripts (e.g., $TE_{10}$ ("tee ee one zero"). The subscripts normally specify how many "half waves" at the guide wavelength are contained in the x and y directions. It will be appreciated by those skilled in the art that the guide wavelength can be different from the free space wavelength because radiation propagates inside the waveguide by reflecting at some angle from the inner walls of the waveguide. In some cases, a third subscript can be added to define the number of half waves in the standing wave pattern along the z-axis.

For a given radiation frequency, the size of the waveguide can be selected to be small enough so that it can support a single propagation mode. In such a case, the system is called a single-mode system (i.e., a single-mode applicator). The $TE_{10}$ mode is usually dominant in a rectangular single-mode waveguide. As the size of the waveguide (or the cavity to which the waveguide is connected) increases, the waveguide or applicator can sometimes support additional higher order modes forming a multi-mode system. When many modes are capable of being supported simultaneously, the system is often referred to as highly moded.

A simple, single-mode system has a field distribution that includes at least one maximum and/or minimum. The magnitude of a maximum largely depends on the amount of radiation supplied to the system. Thus, the field distribution of a single mode system is strongly varying and substantially non-uniform.

Unlike a single-mode cavity, a multi-mode cavity can support several propagation modes simultaneously, which, when superimposed, result in a complex field distribution patter. In such a pattern, the fields tend to spatially smear and, thus, the field distribution usually does not show the same types of strong minima and maxima field values within the cavity. In addition, as explained more fully below, a mode-mixer can be used to "stir" or "redistribute" modes (e.g., by mechanical movement of a radiation reflector). This redistribution desirably provides a more uniform time-averaged field distribution within the cavity.

A multi-mode cavity consistent with this invention can support at least two modes, and may support many more than two modes. Each mode has a maximum electric field vector. Although there may be two or more modes, one mode may be dominant and has a maximum electric field vector magnitude that is larger than the other modes. As used herein, a multi-mode cavity may be any cavity in which the ratio between the first and second mode magnitudes is less than about 1:10, or less than about 1:5, or even less than about 1:2. It will be appreciated by those of ordinary skill in the art that the smaller the ratio, the more distributed the electric field energy between the modes, and hence the more distributed the radiation energy is in the cavity.

The distribution of plasma within a plasma cavity may strongly depend on the distribution of the applied radiation. For example, in a pure single mode system, there may only be a single location at which the electric field is a maximum. Therefore, a strong plasma may only form at that single location. In many applications, such a strongly localized plasma could undesirably lead to non-uniform plasma treatment or heating (i.e., localized overheating and underheating).

Whether or not a single or multimode cavity is used consistent with this invention, it will be appreciated by those of ordinary skill in the art that the cavity in which the plasma is formed can be completely closed or partially open. For example, in certain applications, such as in plasma-assisted furnaces, the cavity could be entirely closed. See, for example, commonly owned, concurrently filed PCT Application No. US03/14133, now expired. In other applications, however, it may be desirable to flow a gas through the cavity, and therefore the cavity must be open to some degree. In this way, the flow, type, and pressure of the flowing gas can be varied over time. This may be desirable because certain gases, such as argon, which facilitate formation of plasma, can be easier to ignite but may not be needed during subsequent plasma processing.

Mode-Mixing

For many plasma-assisted applications, a cavity containing a uniform plasma is desirable. However, because radiation can have a relatively long wavelength (e.g., several tens of centimeters), obtaining a uniform distribution can be difficult to achieve. As a result, consistent with one aspect of this invention, the radiation modes in a multi-mode cavity can be mixed, or redistributed, over a period of time. Because the field distribution within the cavity must satisfy all of the boundary conditions set by the inner surface of the cavity, those field distributions can be changed by changing the position of any portion of that inner surface.

In one embodiment consistent with this invention, a movable reflective surface can be located inside the radiation cavity. The shape and motion of the reflective surface should, when combined, change the inner surface of the cavity during motion. For example, an "L" shaped metallic object (i.e., "mode-mixer") when rotated about any axis will change the location or the orientation of the reflective surfaces in the cavity and therefore change the radiation distribution therein. Any other asymmetrically shaped object can also be used (when rotated), but symmetrically shaped objects can also work, as long as the relative motion (e.g., rotation, translation, or a combination of both) causes some change in the location or orientation of the reflective surfaces. In one embodiment, a mode-mixer can be a cylinder that is rotable about an axis that is not the cylinder's longitudinal axis.

Each mode of a multi-mode cavity may have at least one maximum electric field vector, but each of these vectors could occur periodically across the inner dimension of the cavity. Normally, these maxima are fixed, assuming that the frequency of the radiation does not change. However, by moving a mode-mixer such that it interacts with the radiation, it is possible to move the positions of the maxima. For example, mode-mixer 38 can be used to optimize the field distribution within cavity 12 such that the plasma ignition conditions and/or the plasma sustaining conditions are optimized. Thus, once a plasma is excited, the position of the mode-mixer can be changed to move the position of the maxima for a uniform time-averaged plasma process (e.g., heating).

Thus, consistent with this invention, mode-mixing can be useful during plasma ignition. For example, when an electrically conductive fiber is used as a plasma catalyst, it is known that the fiber's orientation can strongly affect the minimum plasma-ignition conditions. It has been reported, for example, that when such a fiber is oriented at an angle that is greater than 60° to the electric field, the catalyst does little to improve, or relax, these conditions. By moving a reflective surface either in or near the cavity, however, the electric field distribution can be significantly changed.

Mode-mixing can also be achieved by launching the radiation into the applicator chamber through, for example, a rotating waveguide joint that can be mounted inside the applicator chamber. The rotary joint can be mechanically moved (e.g., rotated) to effectively launch the radiation in different directions in the radiation chamber. As a result, a changing field pattern can be generated inside the applicator chamber.

Mode-mixing can also be achieved by launching radiation in the radiation chamber through a flexible waveguide. In one embodiment, the waveguide can be mounted inside the chamber. In another embodiment, the waveguide can extend into the chamber. The position of the end portion of the flexible waveguide can be continually or periodically moved (e.g., bent) in any suitable manner to launch the radiation (e.g., microwave radiation) into the chamber at different directions and/or locations. This movement can also result in mode-mixing and facilitate more uniform plasma processing (e.g., heating) on a time-averaged basis. Alternatively, this movement can be used to optimize the location of a plasma for ignition or other plasma-assisted process.

If the flexible waveguide is rectangular, a simple twisting of the open end of the waveguide will rotate the orientation of the electric and the magnetic field vectors in the radiation inside the applicator chamber. Then, a periodic twisting of the waveguide can result in mode-mixing as well as rotating the electric field, which can be used to assist ignition, modulation, or sustaining of a plasma.

Thus, even if the initial orientation of the catalyst is perpendicular to the electric field, the redirection of the electric field vectors can change the ineffective orientation to a more effective one. Those skilled in the art will appreciated that mode-mixing can be continuous, periodic, or preprogrammed.

In addition to plasma ignition, mode-mixing can be useful during subsequent plasma processing to reduce or create (e.g., tune) "hot spots" in the chamber. When a radiation cavity only supports a small number of modes (e.g., less than 5), one or more localized electric field maxima can lead to "hot spots" (e.g., within cavity 12). In one embodiment, these hot spots could be configured to coincide with one or more separate, but simultaneous, plasma ignitions or processing events. Thus, the plasma catalyst can be located at one or more of those ignition or subsequent processing positions.

Multi-Location Ignition

A plasma can be ignited using multiple plasma catalysts at different locations. In one embodiment, multiple fibers can be used to ignite the plasma at different points within the cavity. Such multi-point ignition can be especially beneficial when a uniform plasma ignition is desired. For example, when a plasma is modulated at a high frequency (i.e., tens of Hertz and higher), or ignited in a relatively large volume, or both, substantially uniform instantaneous striking and restriking of the plasma can be improved. Alternatively, when plasma catalysts are used at multiple points, they can be used to sequentially ignite a plasma at different locations within a plasma chamber by selectively introducing the catalyst at those different locations. In this way, a plasma ignition gradient can be controllably formed within the cavity, if desired.

Also, in a multi-mode cavity, random distribution of the catalyst throughout multiple locations in the cavity increases the likelihood that at least one of the fibers, or any other passive plasma catalyst consistent with this invention, is optimally oriented with the electric field lines. Still, even where the catalyst is not optimally oriented (not substantially aligned with the electric field lines), the ignition conditions are improved.

Furthermore, because a catalytic powder can be suspended in a gas, each powder particle may have the effect of being placed at a different physical location within the cavity, thereby improving ignition uniformity within the cavity.

Dual-Cavity Plasma Igniting/Sustaining

A dual-cavity arrangement can be used to ignite and sustain a plasma consistent with this invention. In one embodiment, a system includes at least a first ignition cavity and a second cavity in fluid communication with the first cavity. To ignite a plasma, a gas in the first ignition cavity can be subjected to electromagnetic radiation having a frequency less than about 333 GHz, optionally in the presence of a plasma catalyst. In this way, the proximity of the first and second cavities may permit a plasma formed in the first cavity to ignite a plasma in the second cavity, which may be sustained with additional electromagnetic radiation.

In one embodiment of this invention, the first cavity can be very small and designed primarily, or solely for plasma ignition. In this way, very little radiation energy may be required to ignite the plasma, permitting easier ignition, especially when a plasma catalyst is used consistent with this invention.

In one embodiment, the first cavity may be a substantially single mode cavity and the second cavity is a multi-mode cavity. When the first ignition cavity only supports a single mode, the electric field distribution may strongly vary within the cavity, forming one or more precisely located electric field maxima. Such maxima are normally the first locations at which plasmas ignite, making them ideal points for placing plasma catalysts. It will be appreciated, however, that when a plasma catalyst is used, it need not be placed in the electric field maximum and, many cases, need not be oriented in any particular direction.

Illustrative Plasma-Assisted Processing in a Manufacturing Line

Methods and apparatus for plasma-assisted processing of work pieces in a manufacturing line may be provided. A plasma-assisted process can include any operation, or combination of operations, involving the use of a plasma. The work pieces can be plasma-processed continuously, periodically, in batches, in sequence, or any combination thereof.

Plasma-assisted processes consistent with this invention can include, for example, sintering, annealing, normalizing, spheroiding, tempering, age hardening, case hardening, or any other type of hardening or process that involves heat-treatment. Plasma-assisted processing can also include joining materials that are the same or different from one another. For example, plasma-assisted processing can include brazing, welding, bonding, soldering, and other types of joining processes. Additional plasma-assisted processes, such as doping, nitriding, carburizing, decrystallizing, carbo-nitriding, cleaning, sterilizing, vaporizing, coating, and ashing, can also be included consistent with this invention.

FIGS. 10-13 show various views of illustrative apparatus 300 for plasma-assisted sintering. It will be appreciated, however, that apparatus 300 can be used to perform any other plasma-assisted process consistent with this invention as well.

Figure 10:
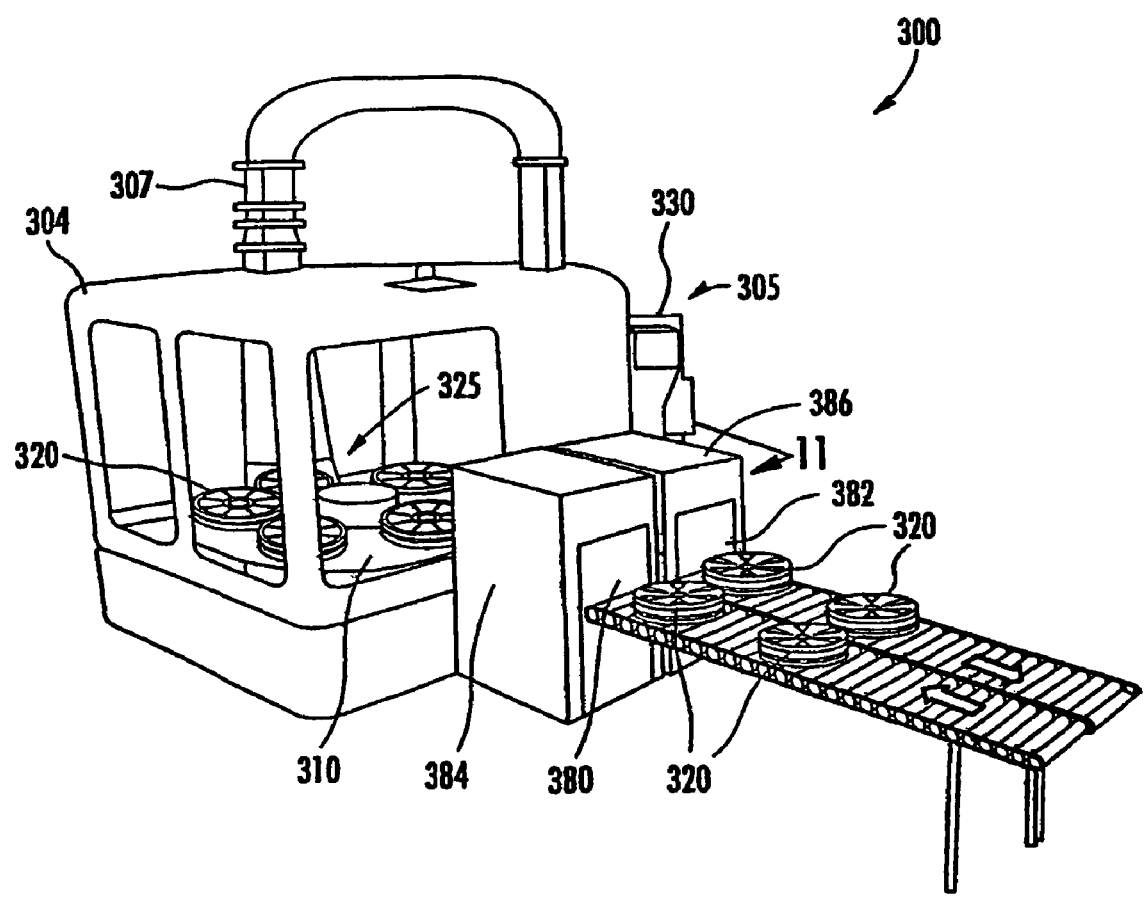
FIG. 10 shows a perspective view of illustrative apparatus for plasma-assisted processing of multiple work pieces consistent with this invention.

FIG. 10 shows a perspective view of illustrative apparatus 300 for plasma-assisted processing of one or more work pieces consistent with this invention. Apparatus 300 can include, for example, radiation source 305, radiation waveguide 307 through which radiation passes from source 305 toward irradiation zone 325, and conveyor 310 for sequentially moving work pieces 320 into and out of irradiation zone 325 adjacent waveguide 307. Apparatus 300 can also include one or more gas ports (not shown) for conveying a gas in, out, or through zone 325 to enable plasma formation there.

Figure 11:
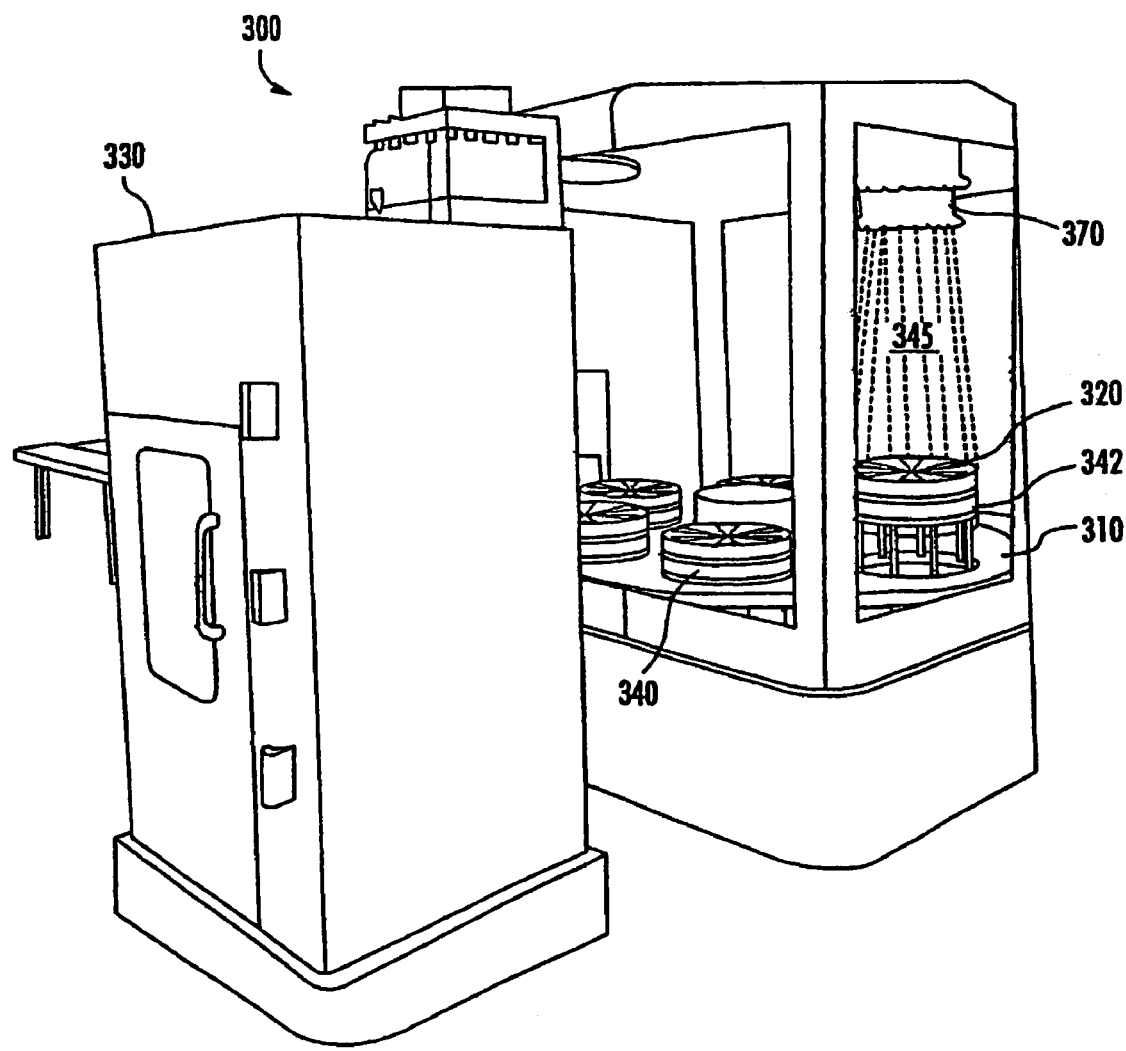
FIG. 11 shows another perspective view of the illustrative apparatus of FIG. 10 consistent with this invention.

FIG. 11 shows another perspective view of apparatus 300, taken along line 11-11 of FIG. 10. Any of radiation source 305 and power supply 335 (not shown) for powering source 305 can be located in housing 330. It will be appreciated, however, that source 305 and supply 335 can be located anywhere in relation to the floor plan, or to meet any other physical or dimensional requirement, of plasma-assisted processing apparatus 300. This includes separating source 305 from supply 335, in or out of housing 330.

Source 305 can irradiate zone 325 from any direction. For example, radiation source 305 can be located above, below, or in the same horizontal plane as zone 325 and waveguide 307 can be used to direct the radiation from source 305 to zone 325. If radiation source 305 is capable of directing radiation in the form of a beam (e.g., a diverging, converging, or collimated beam), then waveguide 307 can be eliminated and the zone can be irradiated simply by directing the radiation beam toward zone 325. In another embodiment, source 305 can supply radiation to zone 325 via one or more coaxial cable (not shown). In yet another embodiment, the radiation output of source 305 can directly irradiate zone 325.

When apparatus 300 includes waveguide 307, waveguide can have any cross-sectional shape to selectively propagate any particular radiation mode or modes. For example, as shown in FIG. 10, waveguide 307 can have a rectangular cross-section, but could also have a round, oval, or other shape capable of propagating radiation. Also, waveguide 307 can be linear, arched, spiral, serpentine, or any other convenient form. In general, waveguide 307 can be used to couple radiation source 305 to a radiation zone (e.g., a cavity) for forming a plasma and performing any type of plasma-assisted process.

Figure 12:
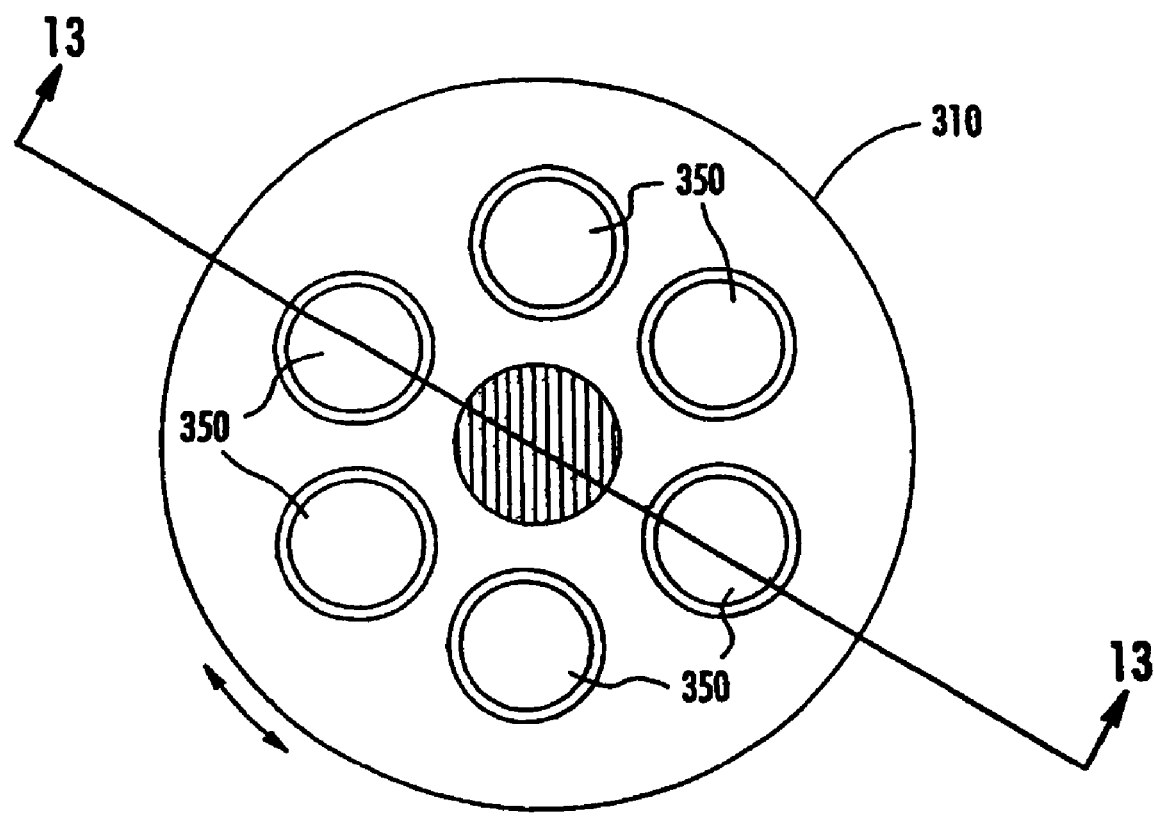
FIG. 12 shows a top plan view of an illustrative conveyor that can be used with the apparatus of FIG. 10 consistent with this invention.

A conveyor can include at least one carrier portion for conveying work pieces. As used herein, a carrier portion can be any portion of a conveyor adapted to carry, support, hold, or otherwise mount one or more work pieces. As shown in FIG. 11, for example, carrier portions 340 and 342 can be circular plates on which one or more work pieces can be placed and conveyed. FIG. 12, for example, shows a top plan view of conveyor 310, including six holes 350 on which carrier portions 340 and 342 can be positioned. Although conveyor 310 has been configured to hold up to six carrier portions, conveyor 310 can be configured to hold more or less carrier portions, if desired. It will be appreciated that a carrier portion consistent with this invention can also be integral with the conveyor or with the work piece.

Figure 14:
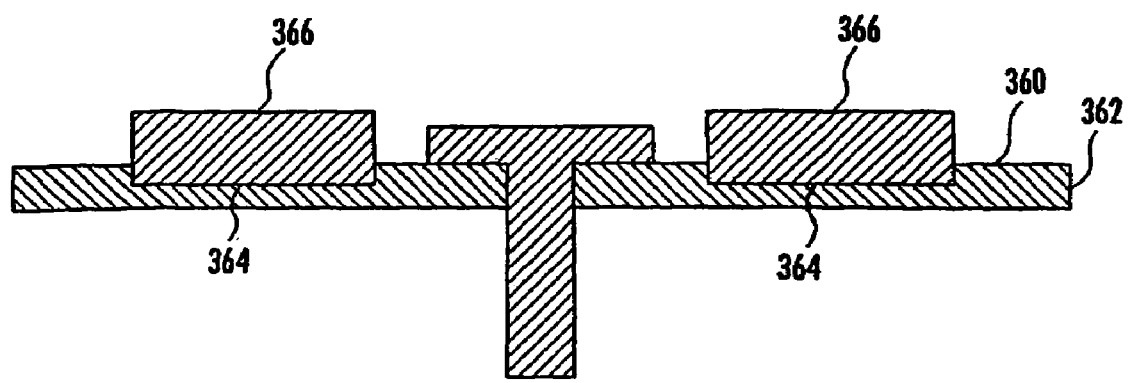
FIG. 14 shows a cross-sectional view of another illustrative conveyor with recesses in which work pieces can be placed consistent with this invention.

Conveyor 310 need not include holes 350 consistent with this invention. For example, as shown in FIG. 14, upper surface 360 of conveyor 362 can include one or more recesses 364 in which one or more work pieces 366 can be placed while conveyor 362 rotates or otherwise moves. Alternatively, a conveyor consistent with this invention can have raised portions or even no surface features at all (not shown). That is, the supporting surface of the conveyor can be substantially flat and one or more work pieces can be placed in any convenient orientation on the surface. In this way, differently shaped work pieces can be used with the same conveyor consistent with this invention.

Figure 13:
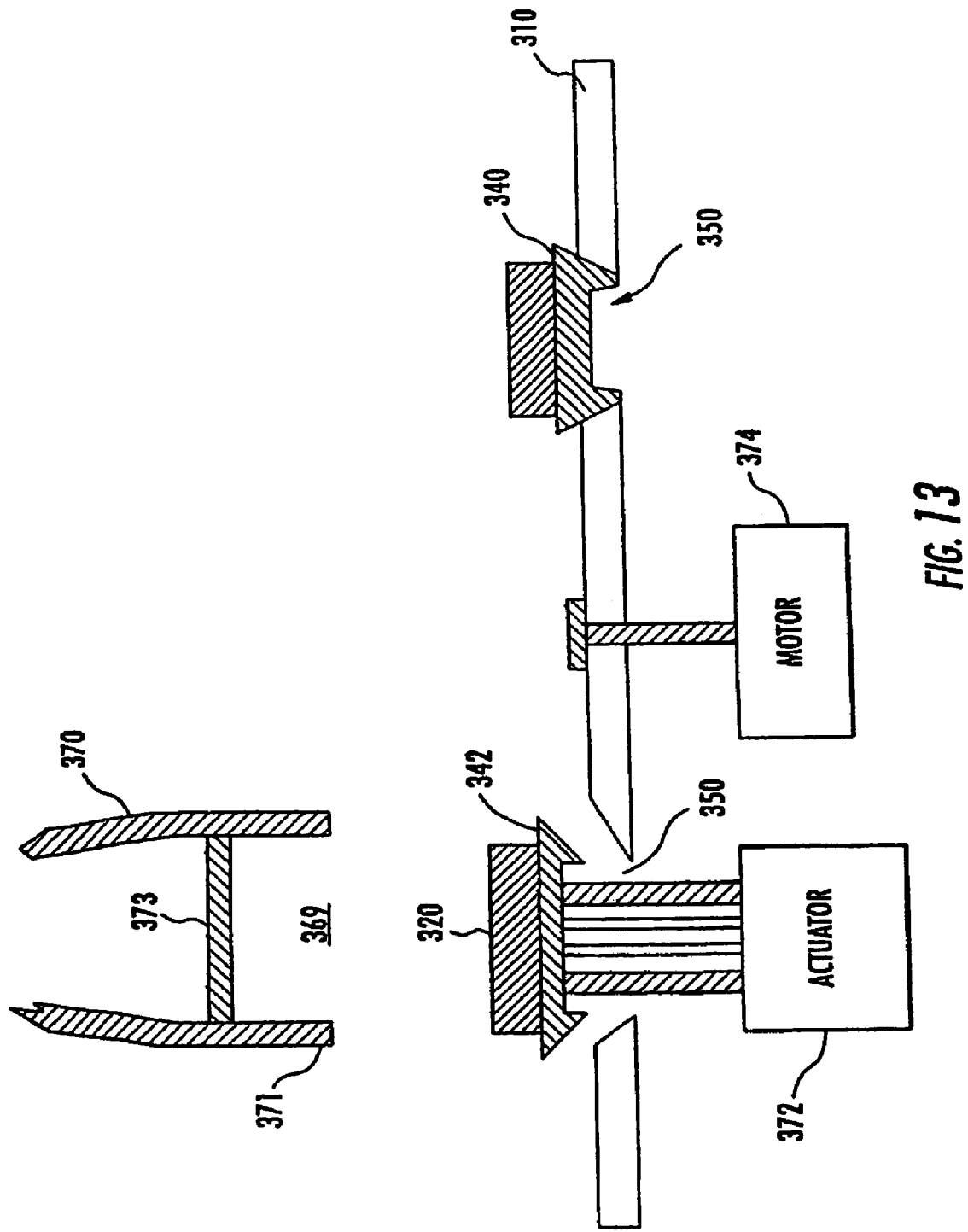
FIG. 13 shows a cross-sectional view of the illustrative conveyor of FIG. 12, taken along line 13-13 of FIG. 12, along with various additional components and work pieces, consistent with this invention.

Any number of work pieces can be carried by carrier portions consistent with this invention. FIGS. 11 and 13, for example, show that carrier portions 340 and 342 each carry a single work piece. In this case, the work piece can be a powdered metal part to be sintered using a plasma. Also, as shown in FIG. 13, carrier portions 340 and 342 can be configured or shaped to fit in or otherwise attach to conveyor 310. For example, the sides of carrier portions 340 and 342 can be tapered so that they precisely fit into holes 350. In addition, the upper surface of the carrier portions can be customized or otherwise adapted so that one or more work pieces are carried or supported in a predetermined position. For this purpose, one or more adaptors can be used with the same carrier portion so that it can be used for differently shaped work pieces and plasma-assisted processes.

A waveguide and at least one carrier portion can cooperate to form a plasma-processing cavity consistent with this invention. For example, FIG. 11 shows tip portion 370 of waveguide 307 facing downward at work piece 320, which is located on carrier portion 342. Thus, work piece 320 can be located between tip portion 370 and carrier portion 342 that, together, form cavity 369 (shown in FIG. 13) in which a plasma can be formed. It will be appreciated that cavity 369 can be open or closed and the "openness" of the cavity depends on the relative position of tip portion 370 with respect to carrier portion 342.

As shown in FIGS. 11 and 13, for example, work piece 320 can be lifted by carrier portion 342 toward tip portion 370 by actuator 372, making the size and openness of cavity 369 smaller. In one embodiment, the gap between tip portion 370 and carrier portion 342 is reduced such that cavity 369 is essentially closed before a plasma is ignited, essentially trapping gas and forming a plasma with that gas. In another embodiment consistent with this invention, a gap remains before, during, or after plasma processing, permitting a gas to flow through the cavity.

In any case, cavity 369 can have the appropriate dimensions to substantially confine the plasma and prevent plasma formation outside cavity 369. Thus, work pieces 320, which can be carried by carrier portions 340 and 342, can be conveyed sequentially into a plasma processing station below tip 370 by rotating conveyor 310 with motor 374.

To prevent gas and plasma from traveling up through waveguide 370, radiation-transmissive plate 373 (e.g., made from quartz or ceramic), can be used as shown in FIG. 13. In this case, plate 373 can act as an upper surface of plasma cavity 369. Waveguide tip 370 can include lip 371, which may be cylindrical, conical, or any other shape configured to form a suitable plasma cavity. During operation, lips 371 can be positioned around part 320 to form the sides of cavity 369. Finally, carrier portion 342, part 320, or conveyor 310 can be used to form the lower part of cavity 369. FIG. 11 illustrates how radiation 345 can be directed toward part 320 into cavity 369 from waveguide tip 370. In practice, however, the distance between tip 370 and part 320 could be reduced to perform a plasma process, thereby making cavity 369 less open.

In another embodiment (not shown), a work piece can be lowered or otherwise positioned at a plasma-processing station using the carrier portion. And, once again, a processing cavity can be formed between either the work piece or the carrier portion and a waveguide tip. Alternatively, as shown in FIG. 1, a plasma-processing cavity can be formed in a substantially radiation-transmissive vessel. In this case, neither the carrier portion nor the waveguide necessarily forms a portion of the plasma cavity. In another embodiment, the waveguide housing can be replaced with a radiation-transmissive housing and used to form a plasma cavity similar to the cavity shown in FIG. 1A, for example. In other words, the waveguide need not be coupled directly to the plasma-processing cavity. It can be coupled to a larger radiation cavity in which the plasma cavity is positioned.

Although work pieces can be carried into place by carrier portions, those work pieces need not carry or otherwise support the work pieces during processing. That is, carrier portions can place the work pieces in a plasma cavity and then remove them from the cavity after processing. The same or different carrier portions can also be used to remove the work pieces after they have been plasma-processed.

As used herein, a conveyor can be any device capable of moving work pieces from one location to another, and in particular to and from a plasma-processing station. Thus, in addition, or as an alternative, to the rotatable table-type conveyors shown in FIGS. 10-14, a conveyor consistent with this invention can include, for example, a belt, a track, a robot, a turntable, a roller, a wheel, a chain, a bucket, a tray, a guide rail, a lift, a screw, a push bar, a ribbon screw, a rail system, an under floor system, a roller system, a slider system, a slat system, a gravity feed system, a chain on edge system, a cable system, a magnetic conveyor, a pulley system, a reciprocating conveyor, or any other moving and positioning mechanisms.

Conveyor 310, as well as plasma-processing cavity 325, can be located in radiation chamber 304 to prevent potentially harmful radiation from escaping the processing station. Radiation chamber 304 can be substantially reflective or otherwise opaque to the radiation supplied by source 305 and being used to form the plasma. Chamber 304 can be particularly useful when one or more of the components that form cavity 325 are substantially transmissive to the radiation supplied by source 305 or when cavity 325 is at least partially open. It will be appreciated, however, that if cavity 325 is sealed (e.g., by waveguide tip 370 and carrier portion 320) potentially harmful radiation can not escape cavity 325 during plasma-assisted processing and chamber 304 may be redundant However, chamber 304 may still be used to trap the processing gas.

Apparatus 300 can include one or more ports for moving work pieces in and out of apparatus 300. For example, apparatus 300 can include entrance port 380 for moving parts 320 into apparatus 300 for plasma-assisted processing. Entrance port 380 can be part of gas lock 384 that substantially isolates a processing gas (e.g., argon, helium, nitrogen, etc.) in chamber 304 from a gas (e.g., air) outside chamber 304. Similarly, apparatus 300 can include exit port 382 for removing parts 320 from apparatus 300 after plasma-assisted processing is complete. Exit port 382 can also be part of gas lock 386 that substantially isolates the processing gas from the gas outside chamber 304. Mechanical arms or guides (not shown) can be used to assist in the loading of parts onto, and the unloading of parts off of, conveyor 310, if desired.

As described more fully above, an active or passive plasma catalyst can be used to ignite, modulate, or sustain a plasma at pressures below, at, or above atmospheric pressure consistent with this invention. Because these catalysts have already been described in detail above, they will not be described again here. In addition, sparking devices, and other devices for inducing a plasma, can also be used consistent with this invention. In any case, the plasma catalyst can be placed in an operable location to relax, or improve, the plasma-ignition requirements. In one embodiment, the plasma catalyst can be located on and carried by a carrier portion or the work piece itself. In another embodiment, the plasma catalyst can be attached or otherwise positioned adjacent to waveguide tip 370.

Figure 15:
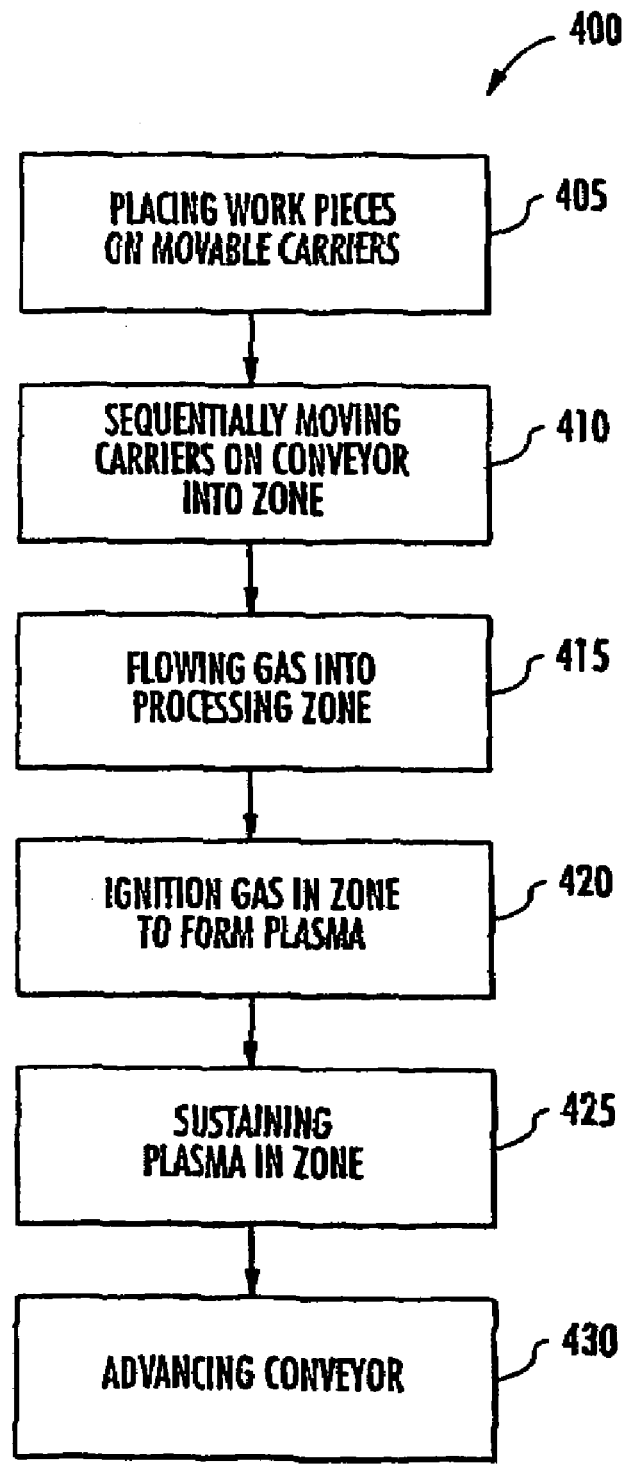
FIG. 15 shows a flow-chart for an illustrative method of plasma-processing a plurality of work pieces consistent with this invention.

FIG. 15 shows a flow-chart for illustrative method 400 of plasma-processing a plurality of work pieces consistent with this invention. The method can include: placing each of the plurality of work pieces in a plurality of movable carriers in step 405, sequentially moving each of the movable carriers on a conveyor into an irradiation zone in step 410, flowing a gas into the zone in step 415, igniting the gas in the zone by subjecting the gas to radiation to form a plasma in step 420, sustaining the plasma for a period of time sufficient to plasma-process at least one of the work pieces in the zone in step 425, and advancing the conveyor to move the at least one processed work piece out of the zone in step 430.

A plasma-processing method consistent with this invention can selectively expose one or more of the work pieces to a plasma. This includes exposing one or more work pieces for a relatively long period of time compared to the others, or to a higher temperature plasma for the same period of time, or a combination thereof. For example, as shown in FIG. 10, work pieces located in radiation zone 325 will be exposed to a plasma while the others work pieces within chamber 304, but not in zone 325, will not be so exposed. Moreover, the rate of rotation of conveyor 310 can be varied or the length of time that a work piece remains in zone 325 can be varied. Moreover, as shown in FIG. 11, the height of carrier 342 and tip 370 can be varied to change the radiation intensity in zone 325 and therefore the plasma intensity there.

In one embodiment, an electric bias can be applied to one or more of the work pieces within an irradiation zone to produce a more uniform and rapid plasma-assisted process. For example, a potential difference can be applied between an electrode (e.g., suspended in a plasma cavity) and a work piece. The work piece can be connected to a voltage source directly, or through one of the moveable carriers. The voltage source can be outside the applicator or irradiation zone and the voltage can be applied through a microwave filter to prevent, for example, microwave energy leakage. The applied voltage can, for example, take the form of a continuous or pulsed DC or AC bias. In the case of a plasma-assisted coating process, the applied voltage may attract charged ions, energizing them, and facilitate coating adhesion and quality.

In the foregoing described embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Embodiments, with each claim standing on its own as a separate preferred embodiment of the invention.

We claim:

1. A method of plasma-assisted processing a plurality of work pieces within a localized irradiation zone that occupies some portion of a radiation chamber, the method comprising:
    placing each of the plurality of work pieces in or on a corresponding movable carrier that is disposed within the radiation chamber;
    sequentially moving each of the movable carriers on a conveyor into the localized irradiation zone of the radiation chamber;
    flowing a gas into the localized irradiation zone;
    igniting the gas in the localized irradiation zone to form a hot plasma;
    sustaining the hot plasma for a period of time sufficient to at least partially plasma-process at least one of the work pieces in the localized irradiation zone; and
    advancing the conveyor to move the at least one plasma-processed work piece out of the localized irradiation zone and into a portion of the radiation chamber in which the at least one plasma-processed work piece is not exposed to the plasma-forming localized irradiation zone.

2. The method of claim 1, wherein the plasma-processing is at least one of sintering, annealing, normalizing, spheroiding, tempering, age hardening, case hardening, joining, doping, nitriding, carburizing, decrystallizing, carbo-nitriding, cleaning, sterilizing, vaporizing, coating and ashing.

3. The method of claim 1 wherein at least one of the work pieces comprises a plurality of parts to be joined.

4. The method of claim 1, wherein the conveyor comprises at least one of a belt, a track, a robot, a turntable, a roller, a wheel, a chain, a bucket, a tray, a guide rail, a lift, a screw, a push bar, a ribbon screw, a rail system, an under floor system, a roller system, a slider system, a slat system, a gravity feed system, a chain on edge system, a cable system, a magnetic conveyor, a pulley system, a reciprocating conveyor, and any other mechanism capable of moving the work pieces from one location to another.

5. The method of claim 1 wherein the work piece includes at least one of a metal, a non-metal, a ceramic, a glass, an organic material, and a non-organic material.

6. The method of claim 1, wherein the irradiation zone includes a housing for adjoining the carrier.

7. The method of claim 6, wherein the housing and the carrier cooperate to form a cavity.

8. The method of claim 7, wherein the housing includes at least a top portion.

9. The method of claim 7, wherein the housing includes an inlet for conveying gas to the cavity.

10. The method of claim 6, further comprising moving the carrier to a position adjacent the housing.

11. The method of claim 6, further comprising moving the housing to a position adjacent the carrier.

12. The method of claim 1, further comprising igniting the plasma using a plasma catalyst.

13. The method of claim 12, wherein the catalyst is at least one of an active catalyst and a passive catalyst.

14. The method of claim 13, wherein the catalyst comprises at least one of metal, inorganic material, carbon, carbon-based alloy, carbon-based composite, electrically conductive polymer, conductive silicone elastomer, polymer nanocomposite, and an organic-inorganic composite.

15. The method of claim 14, wherein the catalyst is in the form of at least one of a nanoparticle, a nano-tube, a powder, a dust, a flake, a fiber, a sheet, a needle, a thread, a strand, a filament, a yarn, a twine, a shaving, a sliver, a chip, a woven fabric, a tape, and a whisker.

16. The method of claim 15, wherein the catalyst comprises carbon fiber.

17. The method of claim 13, wherein the catalyst is in the form of at least one of a nano-particle, a nano-tube, a powder, a dust, a flake, a fiber, a sheet, a needle, a thread, a strand, a filament, a yarn, a twine, a shaving, a sliver, a chip, a woven fabric, a tape, and a whisker.

18. The method of claim 13, wherein the plasma catalyst comprises an active plasma catalyst including at least one ionizing particle.

19. The method of claim 18, wherein the at least one ionizing particle comprises a beam of particles.

20. The method of claim 18, wherein the particle is at least one of an x-ray particle, a gamma ray particle, an alpha particle, a beta particle, a neutron, and a proton.

21. The method of claim 18, wherein the at least one ionizing particle is a charged particle.

22. The method of claim 18, wherein the ionizing particle comprises a radioactive fission product.

23. The method of claim 1, wherein the housing comprises a waveguide.

24. The method of claim 1, wherein at least one of the plurality of work pieces is exposed to a substantially larger amount of plasma than other of the plurality of work pieces.

25. The method of claim 1, wherein the zone includes a housing that cooperates with at least one of the plurality of work pieces to form a cavity.

26. The method of claim 1, wherein the sequentially moving includes moving at least one of the movable carriers continuously.

27. The method of claim 1, wherein the sequentially moving includes moving a plurality of the movable carriers into the zone in batches.

28. The method of claim 1, wherein the sustaining comprises directing an amount of electromagnetic radiation having a frequency less than about 333 GHz into the zone.

29. A method of plasma-assisted processing a plurality of work pieces within a localized irradiation zone that occupies some portion of a radiation chamber, the method comprising:
sequentially conveying a plurality of work pieces into the localized irradiation zone of the radiation chamber;
flowing a gas into the localized irradiation zone;
igniting the gas in the localized irradiation zone to form a hot plasma;
sustaining the hot plasma for a period of time sufficient to at least partially plasma-process at least one of the work pieces in the localized irradiation zone; and
sequentially conveying the plurality of work pieces out of the localized irradiation zone into a portion of the radiation chamber that is not exposed to the plasma-forming localized irradiation zone.

30. The method of claim 29, further comprising placing the plurality of work pieces on a plurality of movable carriers before sequentially conveying the plurality of work pieces into the irradiation zone.

31. The method of claim 30, wherein the irradiation zone includes a housing configured to adjoin at least one of the plurality of carriers, and wherein the method further comprises forming a plasma cavity in the irradiation zone by moving the housing and the at least one of the plurality of carriers closer together.

32. The method of claim 31, wherein the housing includes at least a top portion, and wherein the moving comprises moving the at least one of the plurality of carriers toward the top portion.

33. The method of claim 31, wherein the housing includes at least a top portion, and wherein the moving comprises moving the top portion toward the at least one of the plurality of carriers.

34. The method of claim 29, wherein the igniting the gas comprises exposing the gas to the electromagnetic radiation at a frequency less than about 333 GHZ in the presence of a plasma catalyst at a gas pressure of at least about atmospheric pressure.

35. The method of claim 34, wherein the plasma catalyst is at least one of an active plasma catalyst and a passive plasma catalyst.

36. The method of claim 31, wherein the housing comprises a waveguide.

37. The method of claim 29, wherein the sequentially conveying into the irradiation zone is at least one of continuous and batched.

38. The method of claim 29, wherein the conveying comprises moving the work pieces along a manufacturing line.

39. The method of claim 29, further comprising applying an electric bias to the work piece during the sustaining.

40. The method of claim 39, wherein the applying comprises applying at least one of a DC bias, an AC bias, a pulsed bias, and a continuous bias.

* * * * *